United States Patent
Piper et al.

(10) Patent No.: US 11,327,536 B1
(45) Date of Patent: May 10, 2022

(54) CASE FOR PORTABLE ELECTRONIC COMPUTING DEVICE

(71) Applicant: Pioneer Square Brands, Inc., Seattle, WA (US)

(72) Inventors: Brian Lewis Piper, Seattle, WA (US); Michael Cooper Ferren, Camus, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/402,453

(22) Filed: Aug. 13, 2021

(51) Int. Cl.
| | |
|---|---|
| *A45C 11/00* | (2006.01) |
| *G06F 1/16* | (2006.01) |
| *A45C 13/10* | (2006.01) |
| *A45C 13/00* | (2006.01) |

(52) U.S. Cl.
CPC ............ *G06F 1/1681* (2013.01); *A45C 11/00* (2013.01); *A45C 13/005* (2013.01); *A45C 13/1069* (2013.01); *G06F 1/1656* (2013.01); *A45C 2011/003* (2013.01)

(58) Field of Classification Search
CPC .............. A45C 11/00; A45C 2011/002; A45C 2011/003; A45C 13/005; A45C 13/1069
USPC ........................................................ 206/320
See application file for complete search history.

(56) References Cited

U.S. PATENT DOCUMENTS

| 5,028,075 | A | * | 7/1991 | Donnelly | .................. B42F 9/00 281/49 |
| 6,149,001 | A | * | 11/2000 | Akins | .................... G06F 1/1616 206/320 |
| 9,489,020 | B2 | * | 11/2016 | Ahee | ...................... G06F 1/1626 |
| 9,642,425 | B2 | * | 5/2017 | Tseng | ...................... A45C 11/00 |
| 2006/0226040 | A1 | * | 10/2006 | Medina | ................. G06F 1/1616 361/679.55 |
| 2012/0240521 | A1 | * | 9/2012 | Johnson | ................. A45C 13/02 53/396 |
| 2018/0110306 | A1 | * | 4/2018 | Armstrong | ............. A45C 13/36 |

* cited by examiner

*Primary Examiner* — Steven A. Reynolds
(74) *Attorney, Agent, or Firm* — Grandview Law

(57) ABSTRACT

For a portable electronic computing device with first and second device portions, systems and methods include (I) a first case section including (A) a base including an interior surface such that the first case section being configured to receive the first device portion of the portable electronic computing device; (II) a second case section including (A) a base including an interior surface such that the second case section being configured to receive the second device portion of the portable electronic computing device; and (III) a sheet member including a base coupled with an extending from the base of the second case section, the sheet member including at least one portion of the base being able to flexibly change between at least one first position and at least one second position. In addition, other aspects are described in the claims, drawings, and text forming a part of the present disclosure.

20 Claims, 26 Drawing Sheets

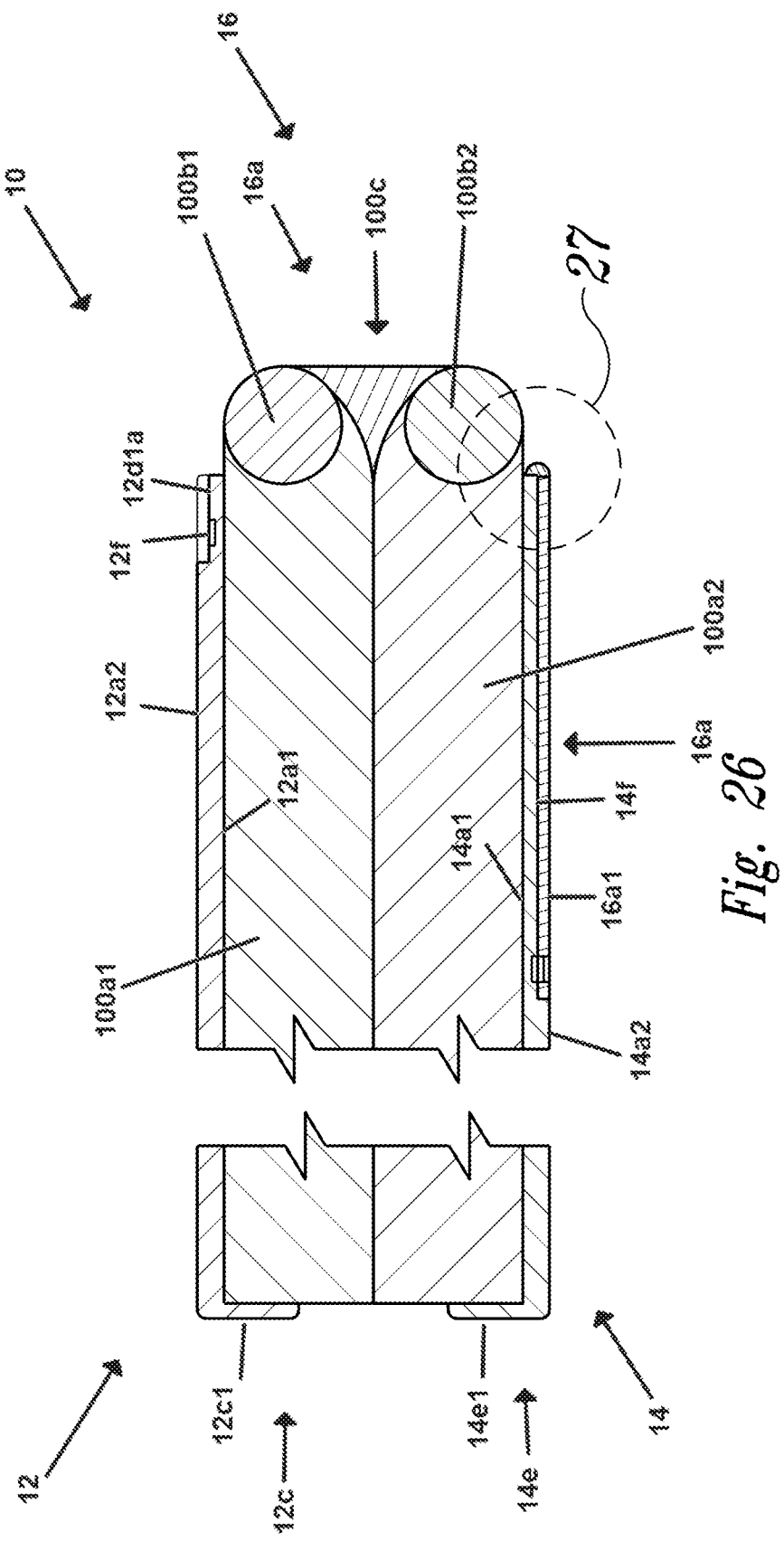

CASE FOR PORTABLE ELECTRONIC COMPUTING DEVICE

SUMMARY

In one or more aspects, a system can include a system for a portable electronic computing device including a first device portion, a second device portion, and a hinge portion, the first device portion hingedly coupled with the second device portion via the hinge portion, the system including (I) a first case section including (A) a base including an interior surface, (B) a first side including a first wall with the first wall extending perpendicularly to the interior surface, (C) a second side including a second wall with the second wall extending perpendicularly to the interior surface, and (D) a third side including a third wall with the third wall extending perpendicularly to the interior surface, wherein the first wall extends perpendicularly to the second wall, and wherein the first wall extends parallel with the third wall such that the first case section being configured to receive the first device portion of the portable electronic computing device; (II) a second case section including (A) a base including an interior surface, (B) a first side including a first wall with the first wall extending perpendicularly to the interior surface, (C) a second side including a second wall with the second wall extending perpendicularly to the interior surface, and (D) a fourth side including a third wall with the third wall extending perpendicularly to the interior surface, wherein the first wall extends perpendicularly to the third wall, and wherein the first wall extends parallel with the second wall such that the second case section being configured to receive the second device portion of the portable electronic computing device; and (III) a sheet member including (A) a base removably couplable to at least one of the following: the first case section and the second case section, (B) the sheet member including at least one portion of the base being able to flexibly change between at least one first position and at least one second position when the base is one of the following: removably coupled to the second case section and fixedly coupled to the second case section, (C) the base being in at least one first spatial contour and being coupled to the first case section when the base is in the at least one first position, and (D) the base being in at least one second spatial contour and being uncoupled from the first case section when the base is in the at least one second position. Wherein when the system is receiving the portable electronic computing device, (A) at least one portion of the base being adjacent to the hinge portion of the portable electronic computing device when the base is in the at least one first position, and (B) at least one portion of the base being nonadjacent to the hinge portion of the portable electronic computing device when the base is in the at least one second position. Wherein the base of the sheet member is fixedly coupled to one of the following: the first case section and the second case section. Further comprising a hinge wherein the base of the sheet member is fixedly coupled via the hinge to one of the following: the first case section and the second case section. Further comprising a reinforcement wherein the base of the sheet member is fixedly coupled via the reinforcement to one of the following: the first case section and the second case section. Wherein the base of the sheet member includes an interior surface and a second edge, (A) in one position of the base, the interior surface being spaced from the second case section across other portions of the base, and (B) in another position of the base, the interior surface being adjacent the second case section. Wherein the base of the sheet member being removably couplable via magnetic coupling to at least one of the following: the first case section and the second case section. Wherein the base of the sheet member being removably couplable via frictional coupling to at least one of the following: the first case section and the second case section. Wherein the base of the sheet member being removably couplable to the first case section and being removably couplable to the second case section. Wherein the base of the sheet member being fixedly coupled to the second case section. Wherein the base of the sheet member being removably coupled to the second case section, the base of the sheet member covering the hinge portion of the portable electronic computing device when the first device portion and the second device portion are being contained by the first case section and the second case section, respectively. Wherein the base of the second case section further includes a second side with an edge. Wherein the base of the sheet member further includes a fourth side with a fourth edge. Wherein the fourth edge of the sheet member being fixedly coupled to the edge of the second case section. Wherein the base of the sheet member further includes a second side with a second edge. Wherein the second edge of the sheet member being removably coupled to the second case section, and wherein at least a portion of the base of the sheet member covers a portion of the second case section. Wherein the at least a portion of the base of the sheet member that covers the portion of the second case section includes covering a recess. Wherein the base further includes an exterior surface being opposite a first portion of the interior surface of the base, and the recess being opposite a second portion of the interior surface of the base. Wherein at least one of more portions of the base of the sheet member is made of a fabric material. Wherein at least one portion of the base of the sheet member is made of a flexible synthetic material selected from a list including but not limited to metalized material, acrylonitrile material (ABS), low density polyethylene (LDPE) material, flexible plastic material, polyvinyl chloride material, thermoplastic polyurethane material, and silicone material. Wherein at least one portion of the first case section and at least one portion of the second case section are made of a hard material selected from a list including but not limited to high-density polyethylene (HDPE) plastic.

In one or more aspects a system can include a system for a system for a portable electronic computing device including a first device portion, a second device portion, and a hinge portion, the first device portion hingedly coupled with the second device portion via the hinge portion, the system including (I) a first case section including (A) a base including an interior surface such that the first case section being configured to receive the first device portion of the portable electronic computing device; (II) a second case section including (A) a base including an interior surface such that the second case section being configured to receive the second device portion of the portable electronic computing device; and (III) a sheet member including a base coupled with an extending from the base of the second case section, the sheet member including at least one portion of the base being able to flexibly change between at least one first position and at least one second position.

In one or more aspects a system can include a system for a portable electronic computing device including a first device portion, and a hinge portion, the first device portion coupled with the hinge portion, the system including (I) a first case section including (A) a base including an interior surface such that the first case section being configured to receive the first device portion of the portable electronic computing device; and (II) a sheet member including a base coupled with an extending from the base of the first case section, the sheet member including at least one portion of the base that is flexible. Wherein at least one portion of the base of the sheet member is made of a flexible synthetic material selected from a list including but not limited to metalized material, acrylonitrile material (ABS), low density polyethylene (LDPE) material, flexible plastic material, polyvinyl chloride material, thermoplastic polyurethane material, and silicone material, and wherein at least one portion of the first case section is made of a hard material selected from a list including but not limited to high-density polyethylene (HDPE) plastic.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a case for portable electronic computing device systems, articles of manufacture, compositions of matter for same that may provide context, for instance, in introducing one or more processes and/or devices described herein.

FIG. 26 is a modification of FIG. 12 showing sheet member further uncoupled from first case section and being fully folded back onto second case section.

DETAILED DESCRIPTION

Figure 1:
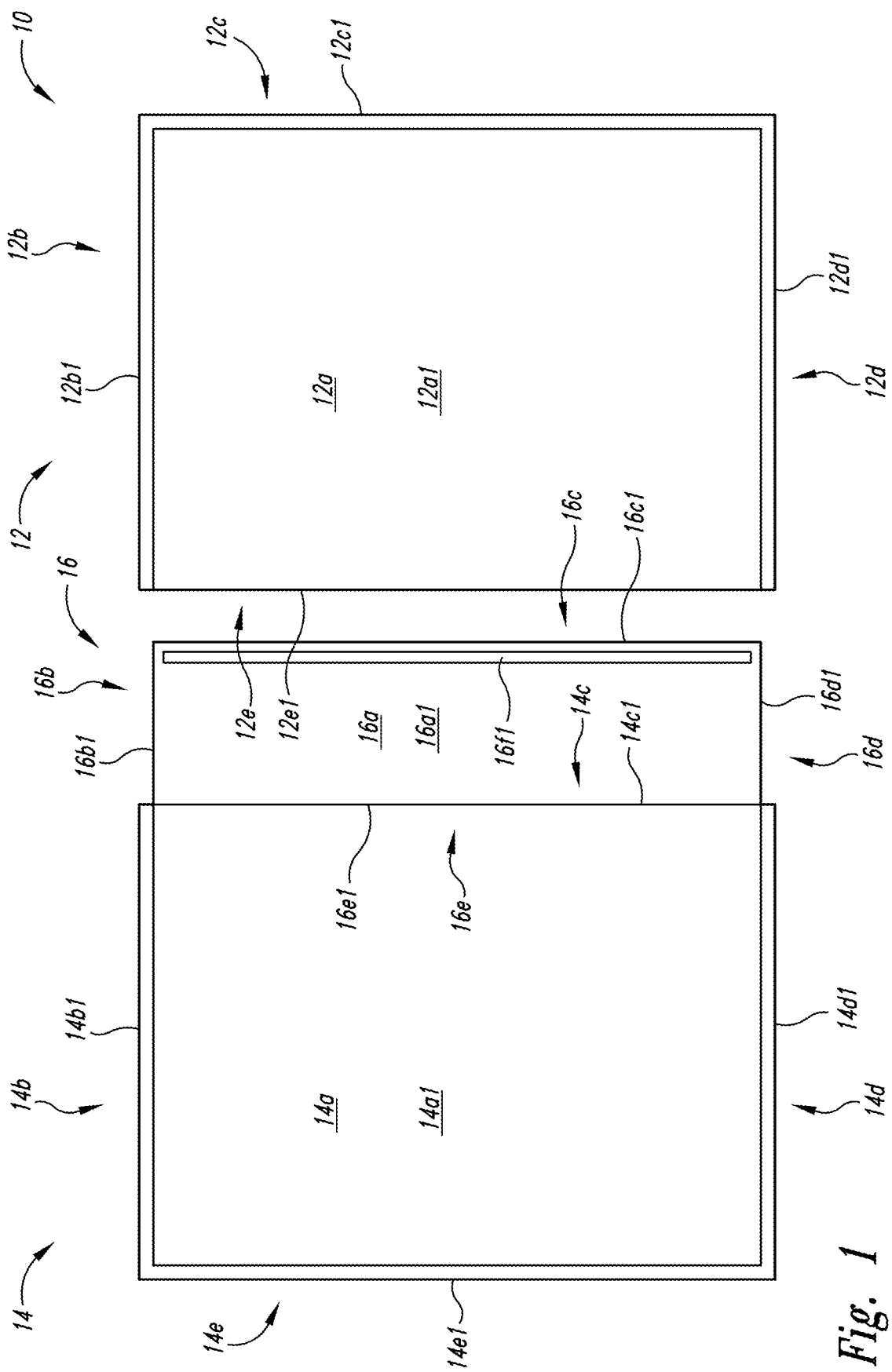
FIG. 1 is an anterior plan view of device case assembly including sheet member, first case section, and second case section for portable electronic computing device with sheet member uncoupled from first case section and extended from second case member.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an anterior plan view of device case assembly 10 including sheet member 16, first case section 12, and second case section 14 for portable electronic computing device 100 with sheet member 16 uncoupled from first case section 12 and extended from second case member 14. In implementations, first case section 12 is shown to include base 12a with interior surface 12a1, first side 12b with first wall 12b1, second side 12c with second wall 12c1, third side 12d with third wall 12d1, and fourth side 12e with edge 12e1. In implementations, second case section 14 is shown to include base 14a with interior surface 14a1, first side 14b with first wall 14b1, second side 14c with edge 14c1, second side 14d with second wall 14d1, and fourth side 14e with third wall 14e1. In implementations, sheet member 16 is shown to include base 16a with interior surface 16a1, first side 16b with first edge 16b1, second side 16c with second edge 16c1, third side 16d with third edge 16d1, fourth side 16e with fourth edge 16e1, and sheet member 16 with coupler 16/1.

Figure 2:
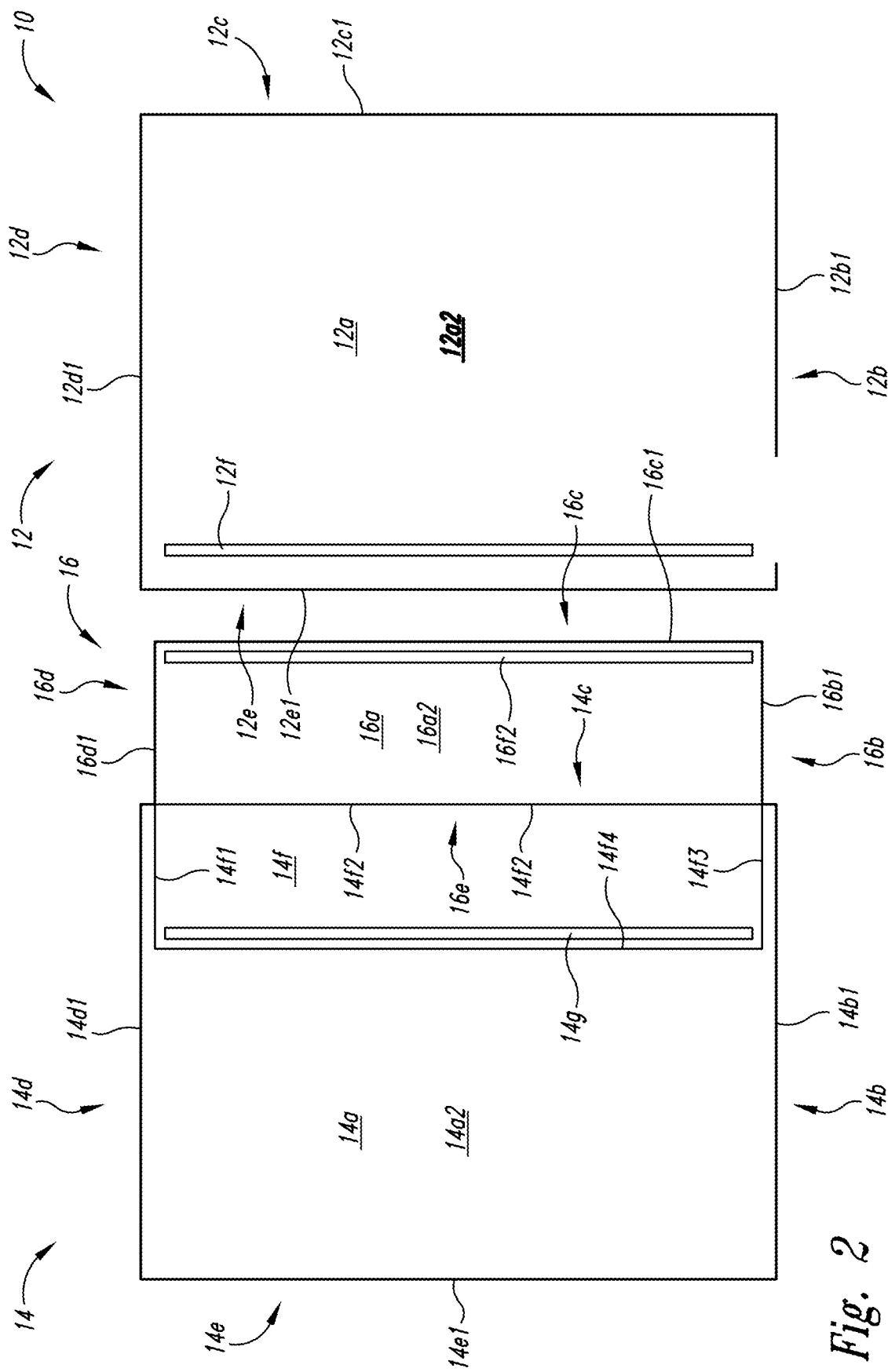
FIG. 2 is a posterior plan view of device case assembly of FIG. 1.

Turning to FIG. 2, depicted therein is a posterior plan view of device case assembly of FIG. 1. In implementations, base 12a is shown to include exterior surface 12a2. In implementations, third wall 12d1 is shown to include recess 12d1a. In implementations, first case section 12 is shown to include coupler 12f. In implementations, base 14a is shown to include exterior surface 14a2. In implementations, second case section 14 is shown to include recess 14f with first side 14f1, second side 14f2, third side 14f3, and fourth side 14f4. In implementations, second case section 14 is shown to include coupler 14g. In implementations, sheet member 16 is shown to include coupler 16f2.

Figure 3:
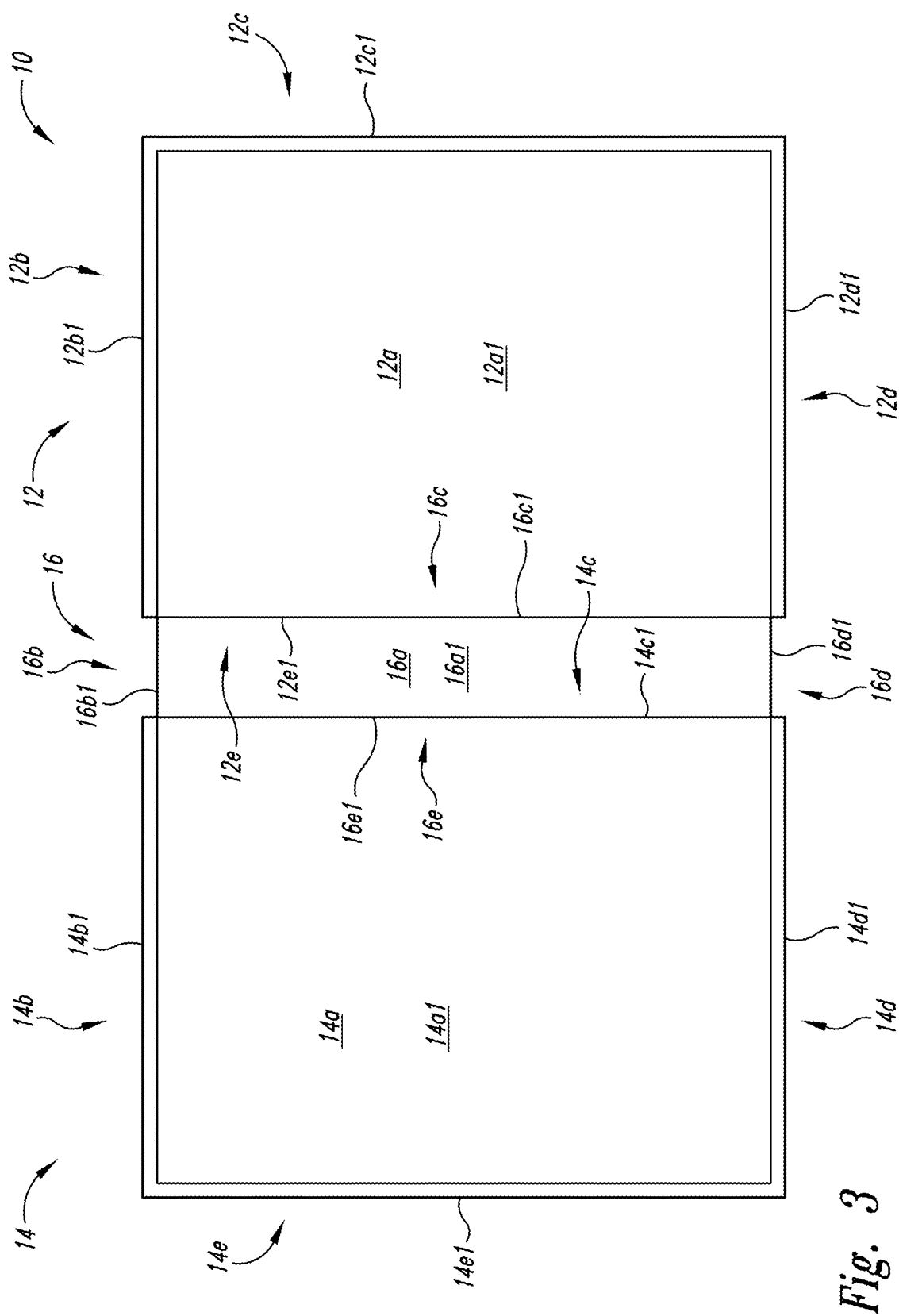
FIG. 3 is an anterior plan view of device case of FIG. 1 with sheet member coupled with first case section.

Turning to FIG. 3, depicted therein is an anterior plan view of device case of FIG. 1 with sheet member coupled with first case section.

Figure 4:
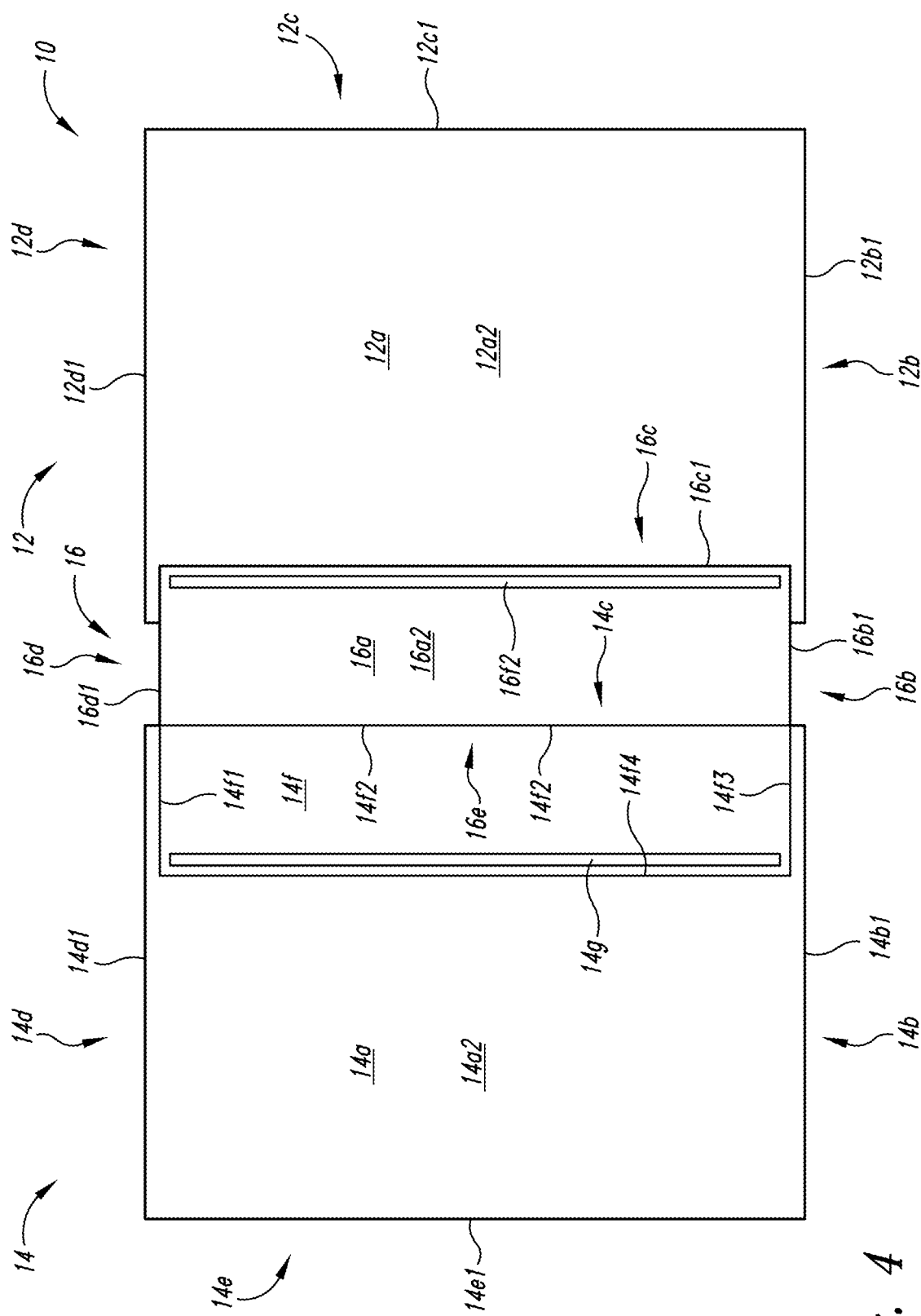
FIG. 4 is a posterior plan view of device case assembly configuration of FIG. 3.

Turning to FIG. 4, depicted therein is a posterior plan view of device case assembly configuration of FIG. 3.

Figure 5:
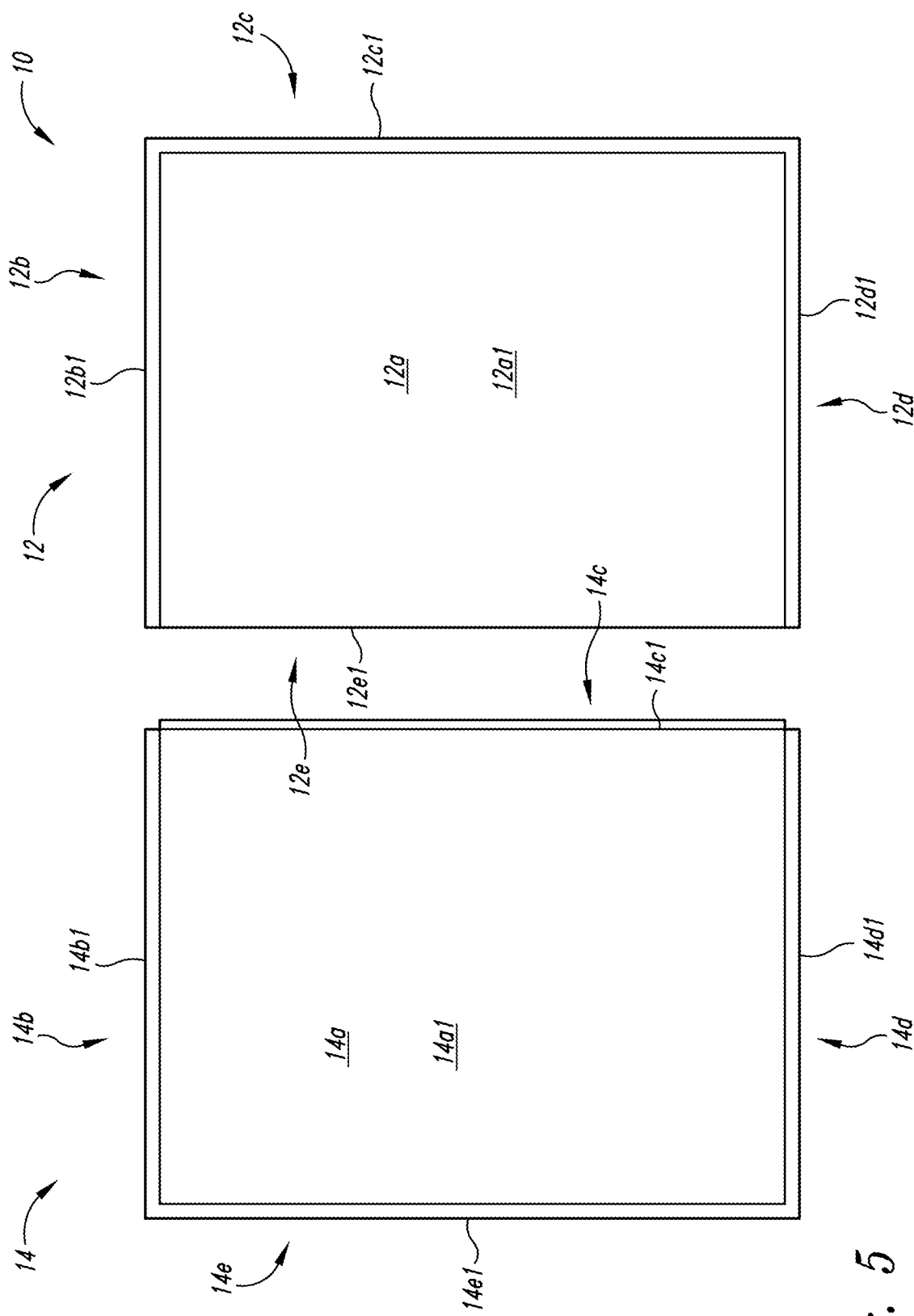
FIG. 5 is an anterior plan view of device case assembly of FIG. 1 with sheet member folded onto second case member.

Turning to FIG. 5, depicted therein is an anterior plan view of device case assembly of FIG. 1 with sheet member folded onto second case member.

Figure 6:
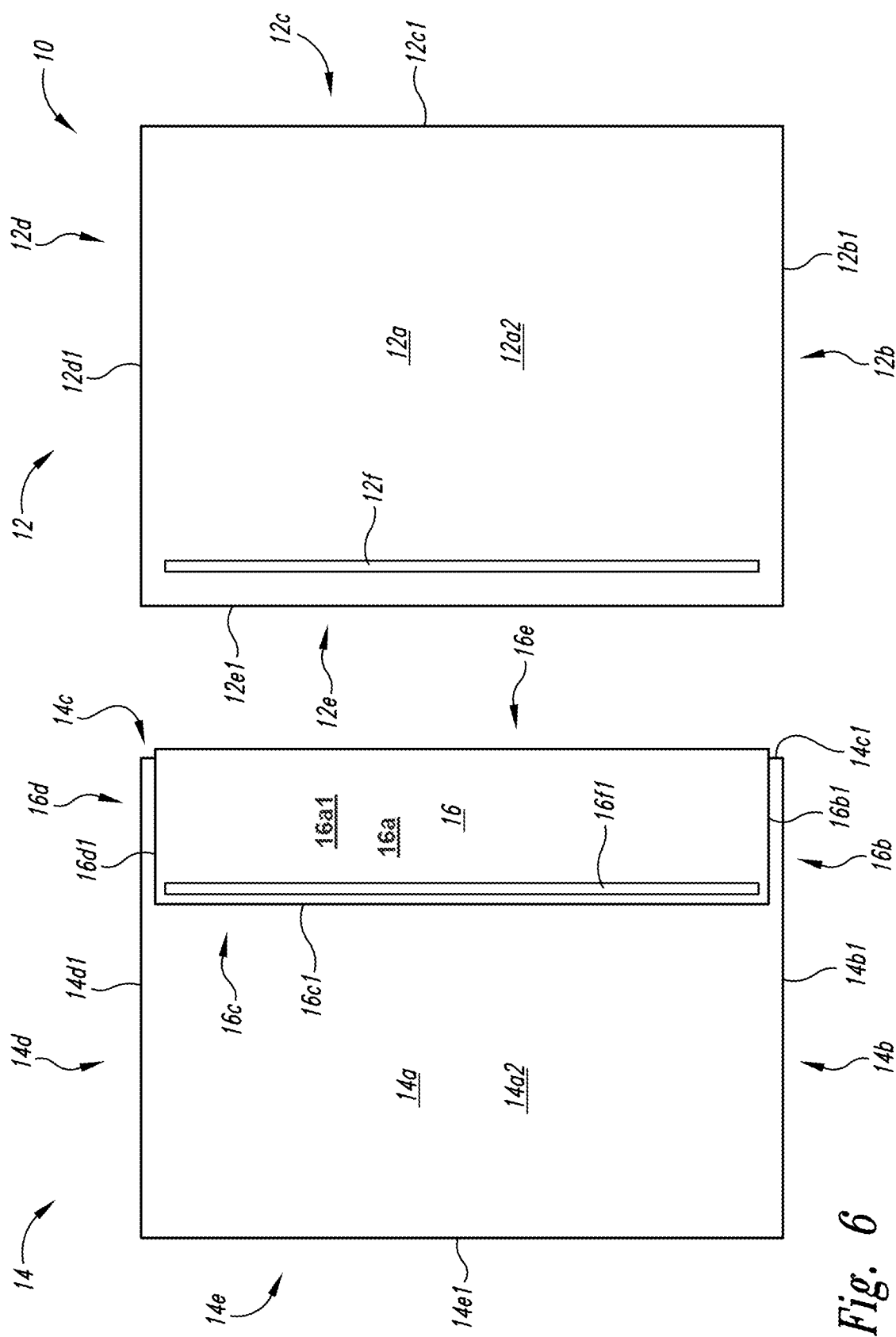
FIG. 6 is a posterior plan view of device case assembly configuration of FIG. 5.

Turning to FIG. 6, depicted therein is a posterior plan view of device case assembly configuration of FIG. 5.

Figure 7:
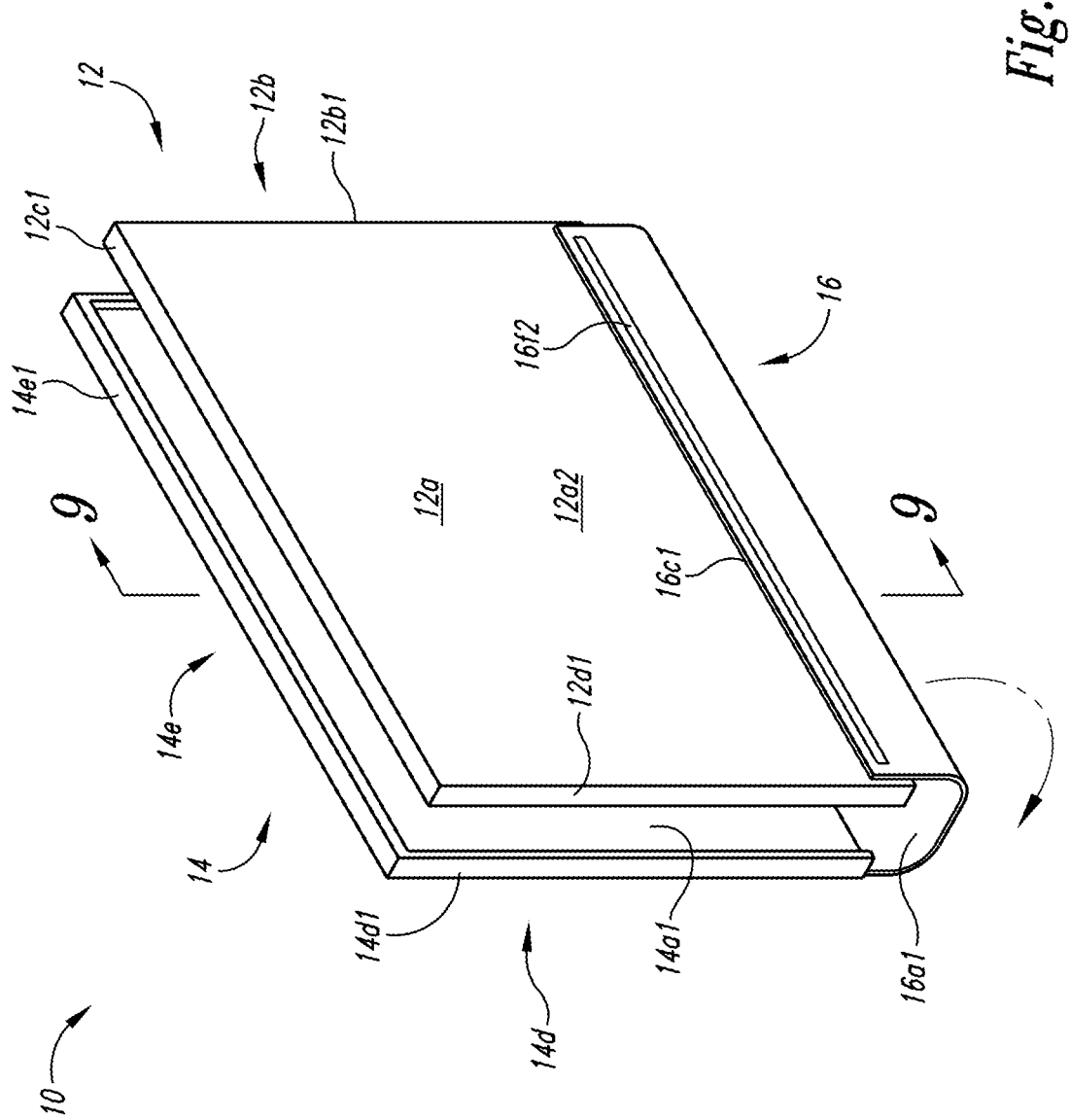
FIG. 7 is a perspective view of device case assembly configuration of FIG. 1.

Turning to FIG. 7, depicted therein is a perspective view of device case assembly configuration of FIG. 1.

Figure 8:
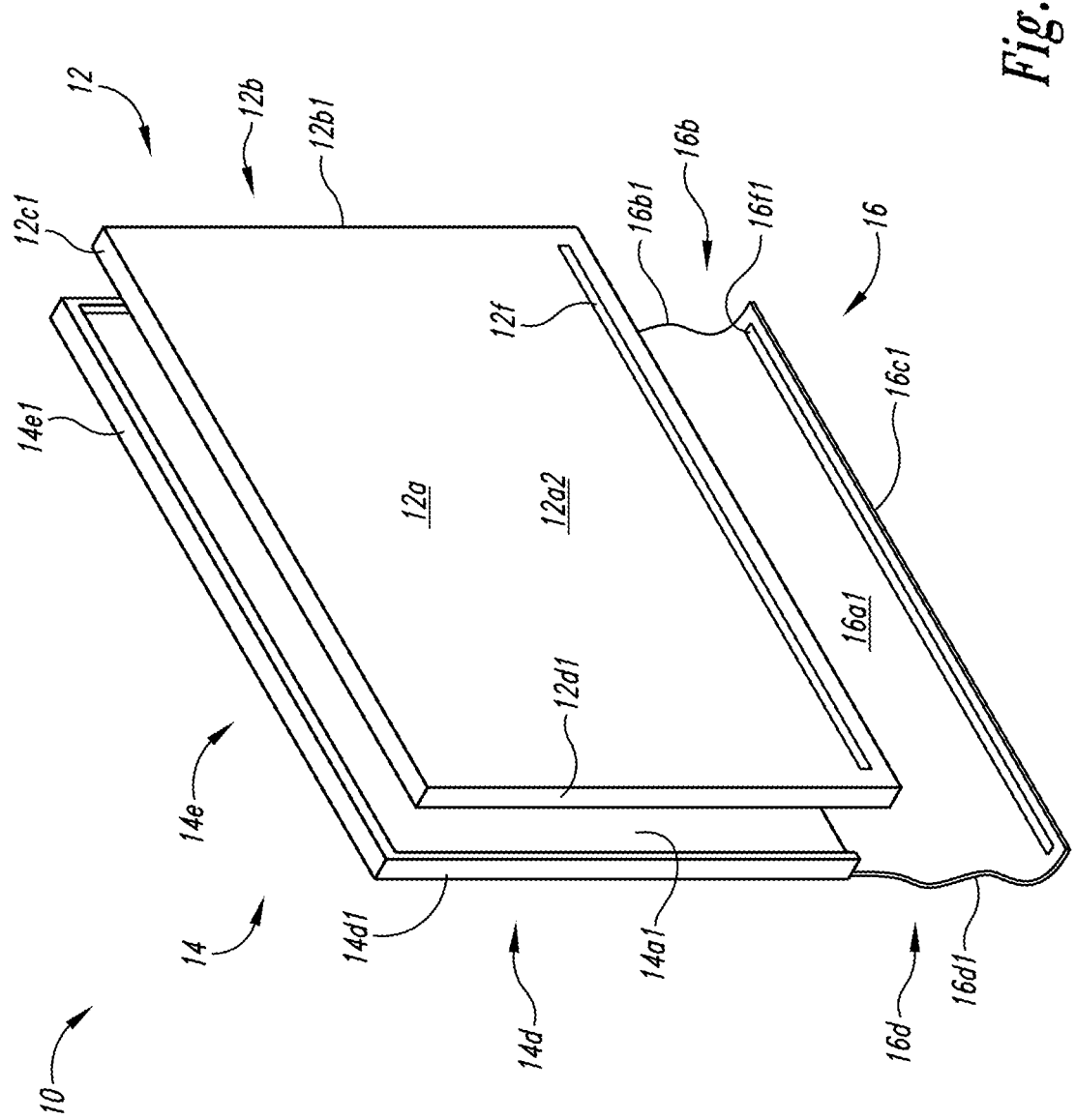
FIG. 8 is a perspective view of the device case assembly configuration of FIG. 3.

Turning to FIG. 8, depicted therein is a perspective view of the device case assembly configuration of FIG. 3.

Figure 9:
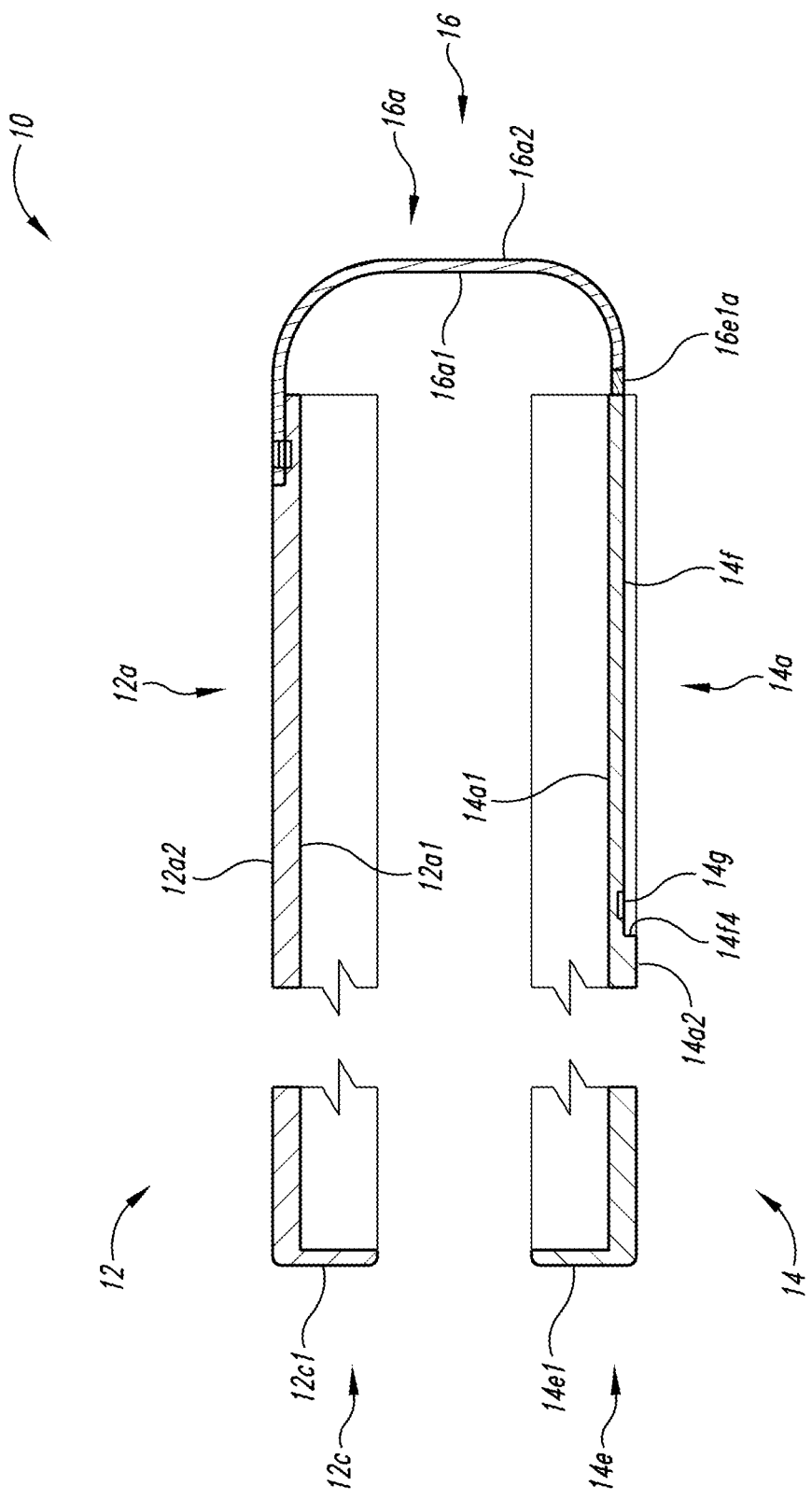
FIG. 9 is a side-elevational cross-sectional view of device case assembly of FIG. 7 taken along the cut line 9-9 shown in FIG. 7.

Turning to FIG. 9, depicted therein is a side-elevational cross-sectional view of device case assembly of FIG. 7 taken along the cut line 9-9 shown in FIG. 7. In implementations, the fourth edge 16e1 is shown to include reinforcement 16e1a.

Figure 10:
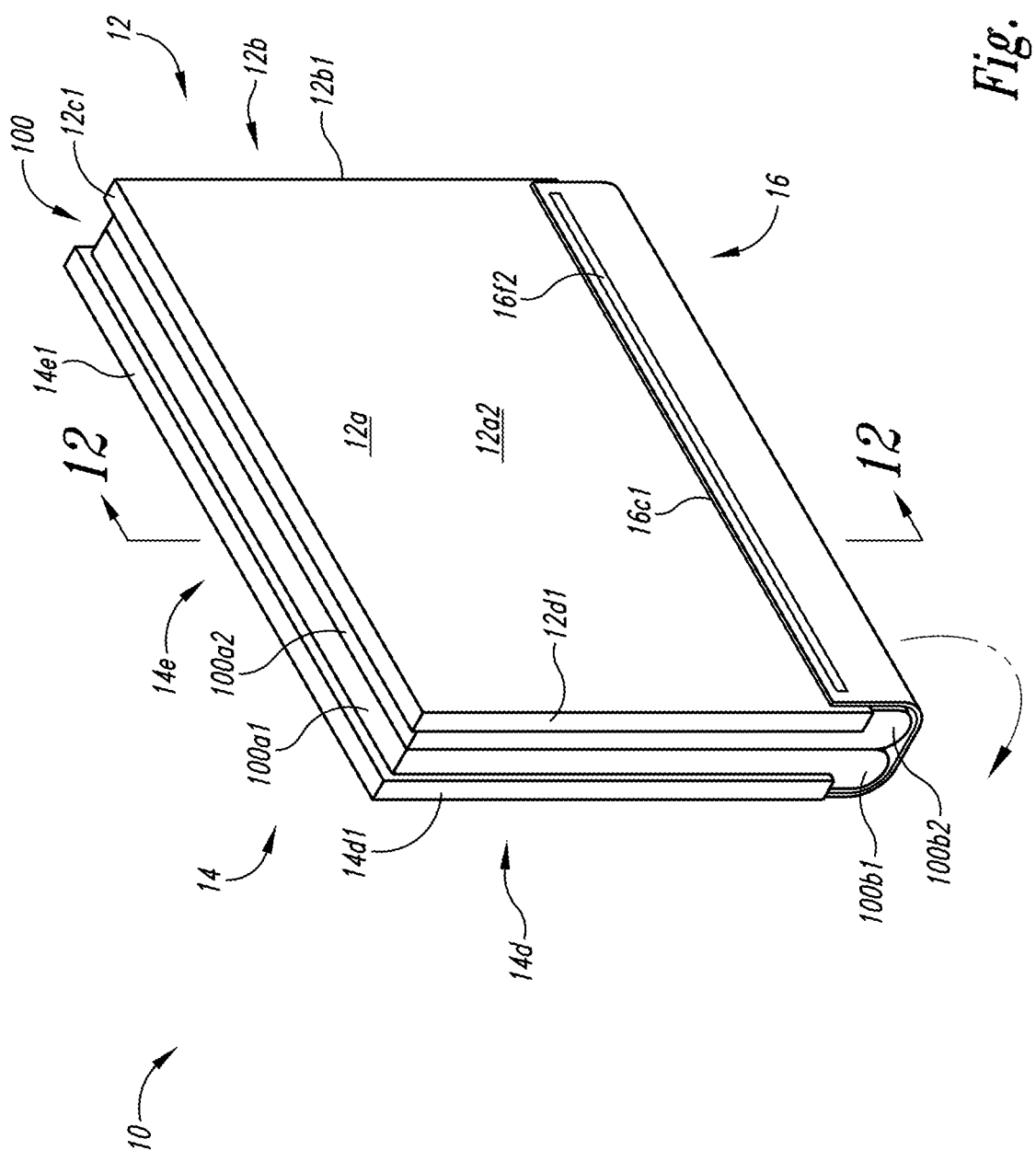
FIG. 10 is a perspective view of device case assembly configuration of FIG. 1 with device case assembly receiving portable electronic computing device.

Turning to FIG. 10, depicted therein is a perspective view of device case assembly configuration of FIG. 1 with device case assembly receiving portable electronic computing device. In implementations portable electronic computing device 100 is shown to include first device portion 100a1 (e.g. display portion or keyboard portion) device case assembly 10, second device portion 100a2 (e.g. keyboard portion or display portion), first pivot 100b1, and second pivot 100b2.

Figure 11:
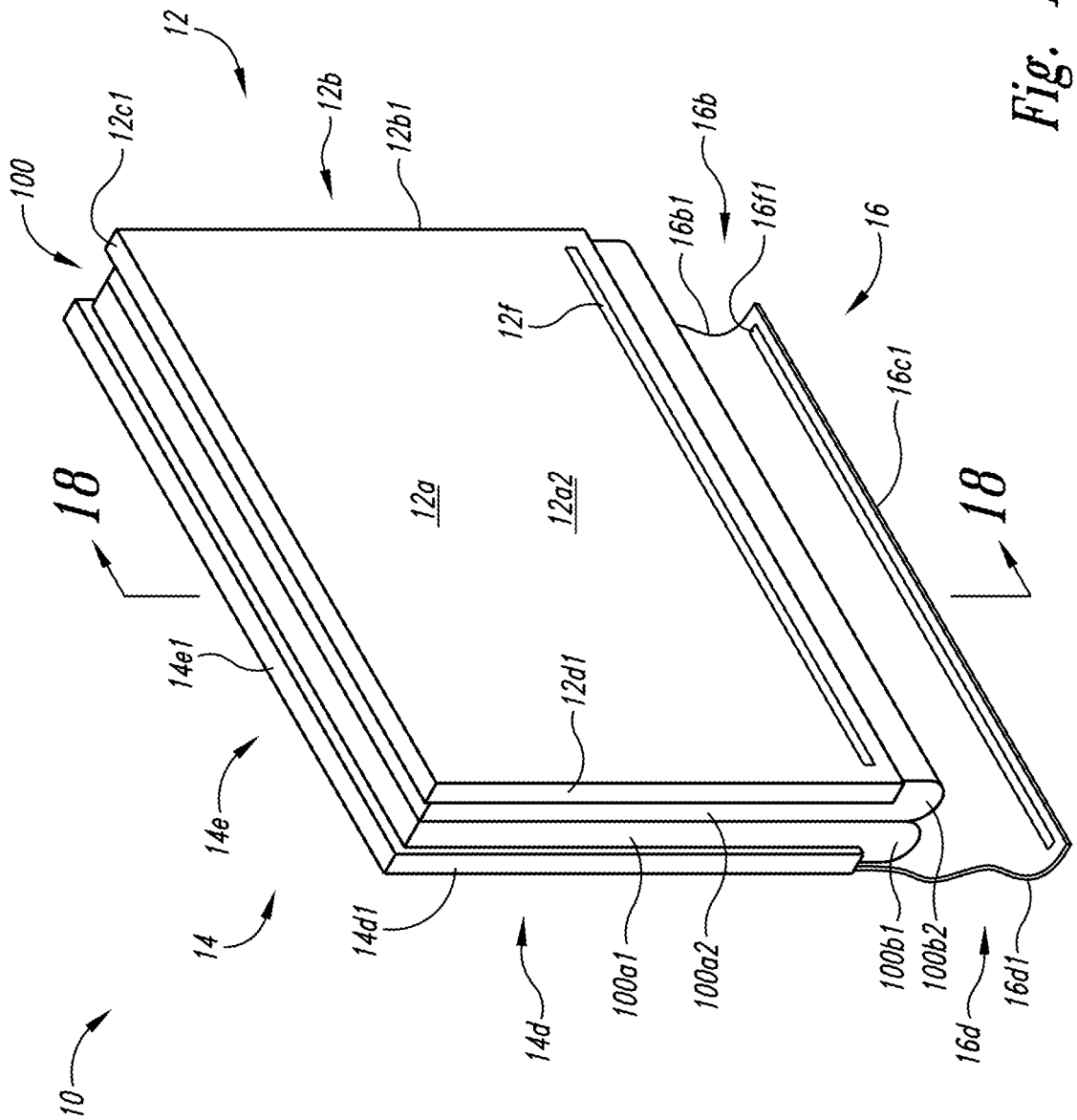
FIG. 11 is a perspective view of the device case assembly configuration of FIG. 3 with device case assembly receiving portable electronic computing device.

Turning to FIG. 11, depicted therein is a perspective view of the device case assembly configuration of FIG. 3 with device case assembly receiving portable electronic computing device.

Figure 12:
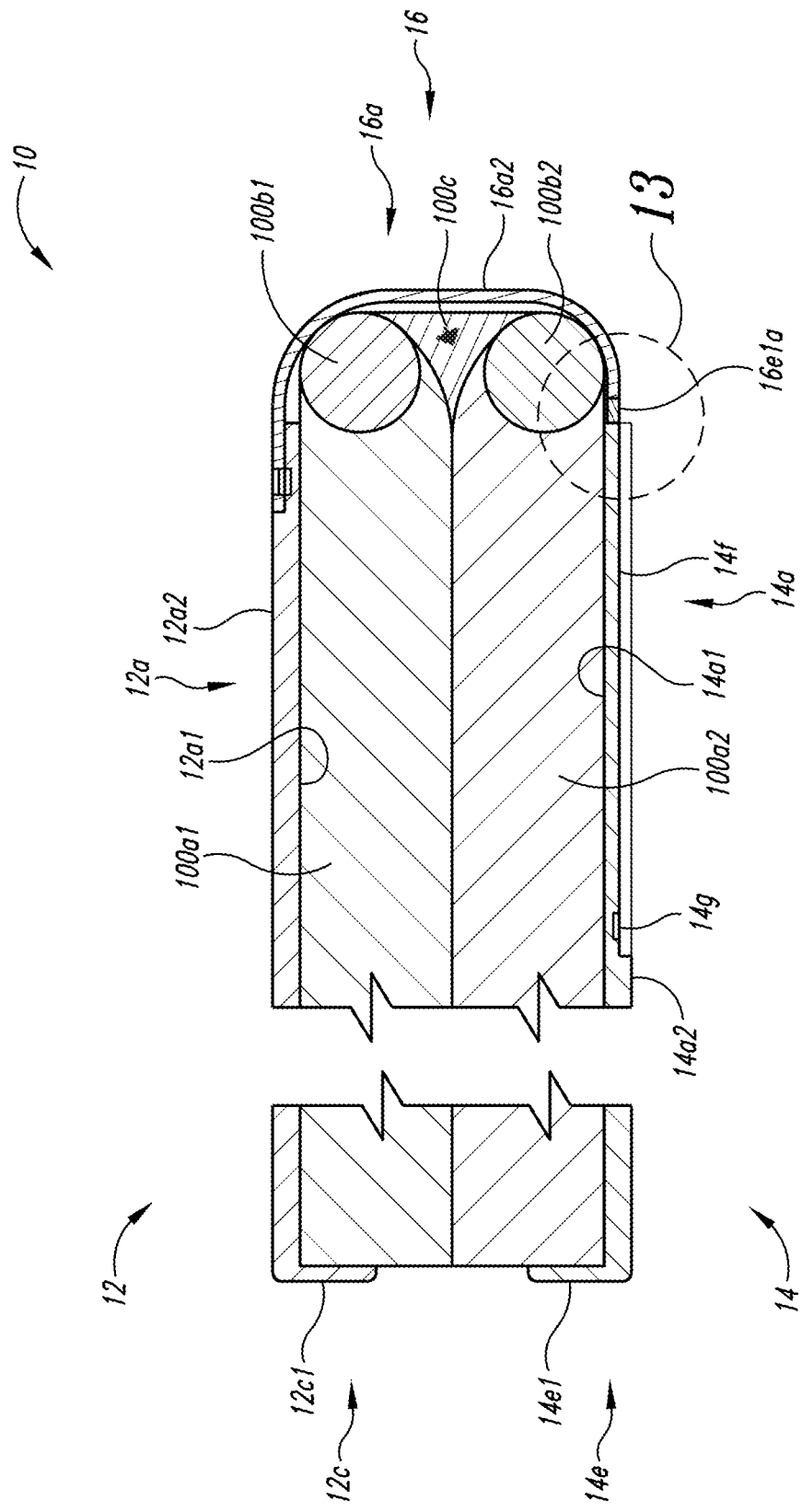
FIG. 12 is a side-elevational cross-sectional view of device case assembly of FIG. 10 taken along the cut line 12-12 shown in FIG. 10 with device case assembly receiving portable electronic computing device.

Turning to FIG. 12, depicted therein is a side-elevational cross-sectional view of device case assembly of FIG. 10 taken along the cut line 12-12 shown in FIG. 10 with device case assembly receiving portable electronic computing device. In implementations, portable electronic computing device 100 is shown to include hinge portion 100c with first pivot 100b1 and second pivot 100b2 hingedly coupling first device portion 100a1 (e.g. display portion or keyboard portion) and second device portion 100a2 (e.g. keyboard portion or display portion) together.

Figure 13:
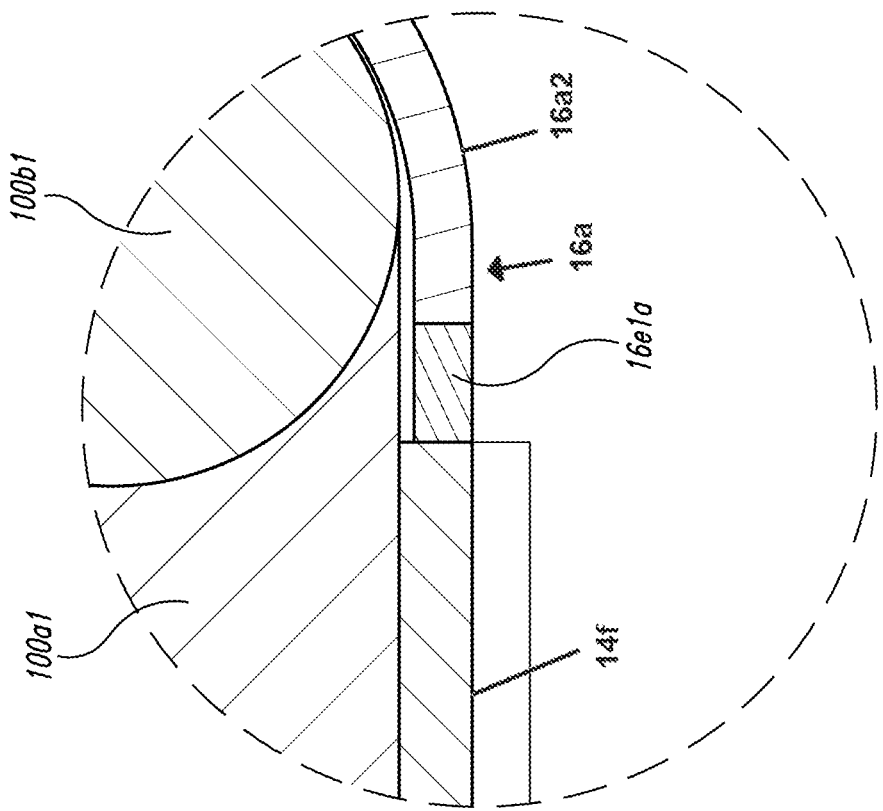
FIG. 13 is an enlarged side elevational cross-sectional view of a dashed-circle portion of the device case assembly of FIG. 12 labeled "13" shown in FIG. 12.

Turning to FIG. 13, depicted therein is an enlarged side elevational cross-sectional view of a dashed-circle portion of the device case assembly of FIG. 12 labeled "13" shown in FIG. 12.

Figure 14:
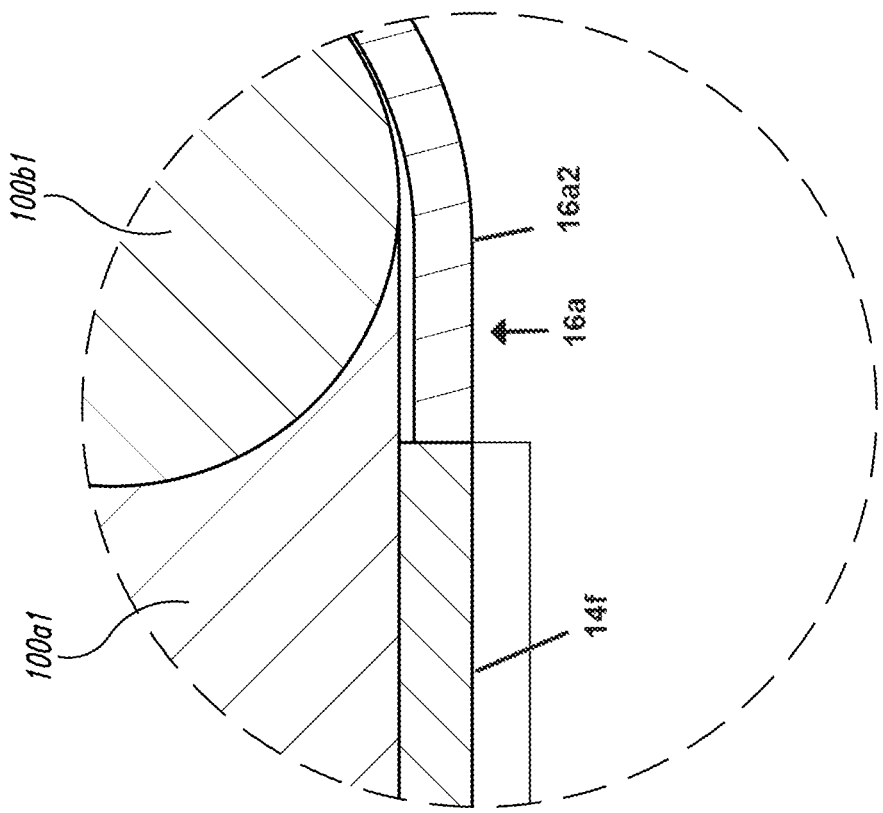
FIG. 14 is modification to FIG. 13 showing a component alternative.

Turning to FIG. 14, depicted therein is modification to FIG. 13 showing a component alternative.

Figure 15:
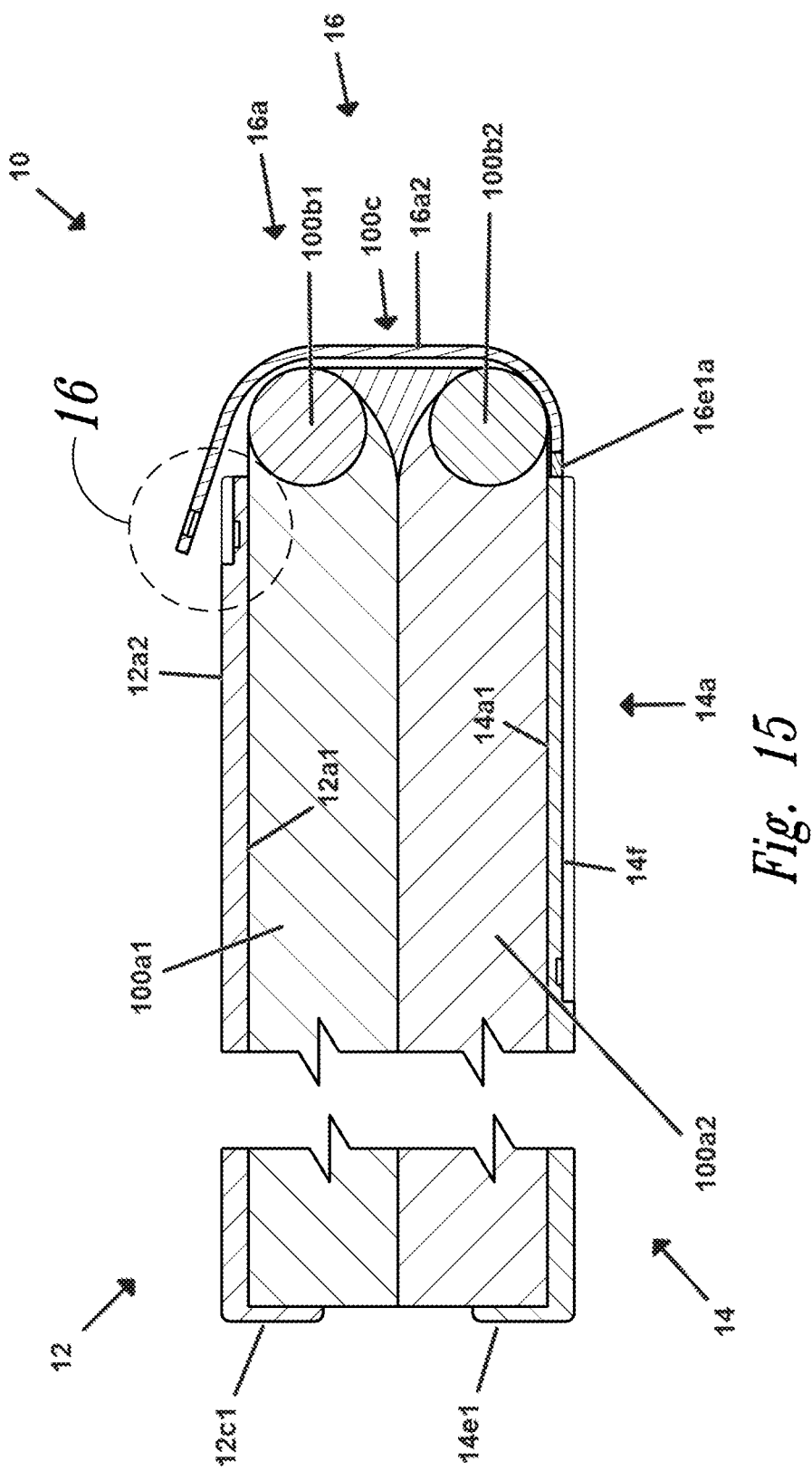
FIG. 15 is a modification of FIG. 12 showing sheet member uncoupled from first case section.

Turning to FIG. 15, depicted therein is a modification of FIG. 12 showing sheet member uncoupled from first case section.

Figure 16:
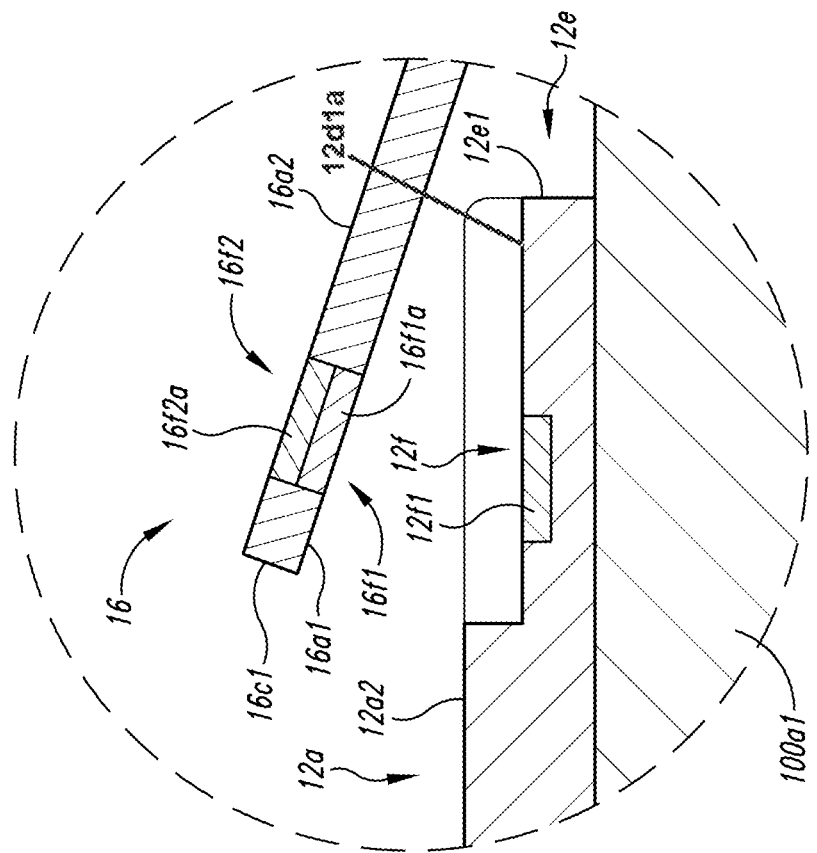
FIG. 16 is an enlarged side elevational cross-sectional view of a dashed-circle portion of the device case assembly of FIG. 15 labeled "16" shown in FIG. 15.

Turning to FIG. 16, depicted therein is an enlarged side elevational cross-sectional view of a dashed-circle portion of the device case assembly of FIG. 15 labeled "16" shown in FIG. 15. In implementations, coupler 12f is shown to include magnetic coupler 12f1. In implementations, coupler 16f1 is shown to include magnetic coupler 16f1a. In implementations, coupler 16f2 is shown to include magnetic coupler 16f2a.

Figure 17:
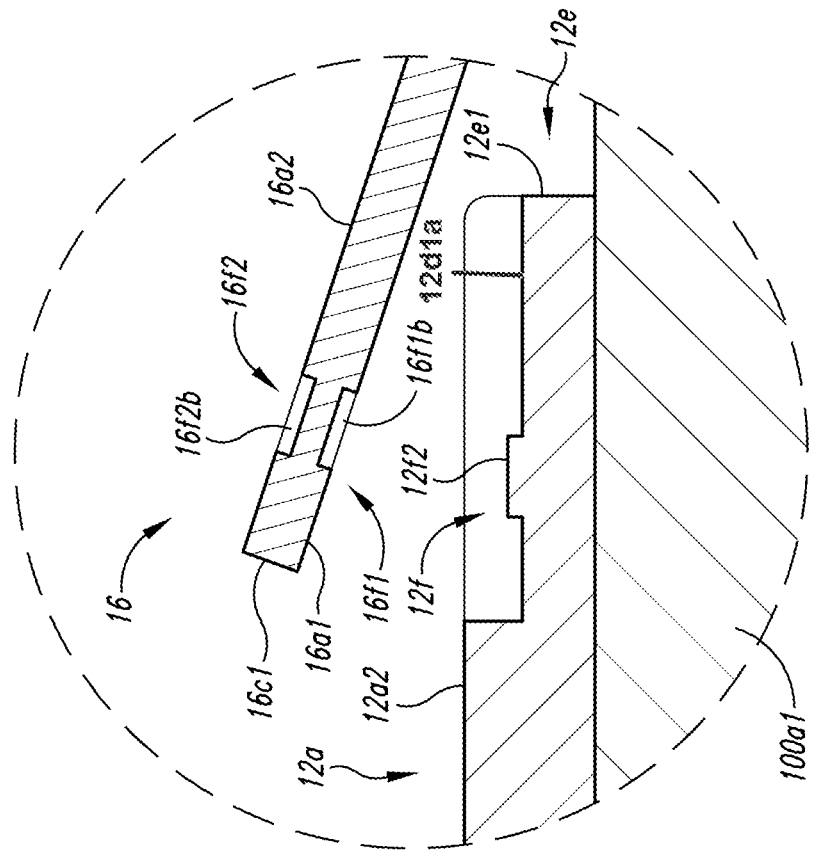
FIG. 17 is modification to FIG. 16 showing a component alternative.

Turning to FIG. 17, depicted therein is modification to FIG. 16 showing a component alternative. In implementations, coupler 12f is shown to include frictional coupler 12f2. In implementations, coupler 16f1 is shown to include frictional coupler 16f1b. In implementations, coupler 16f2 is shown to include frictional coupler 16f2b.

Figure 18:
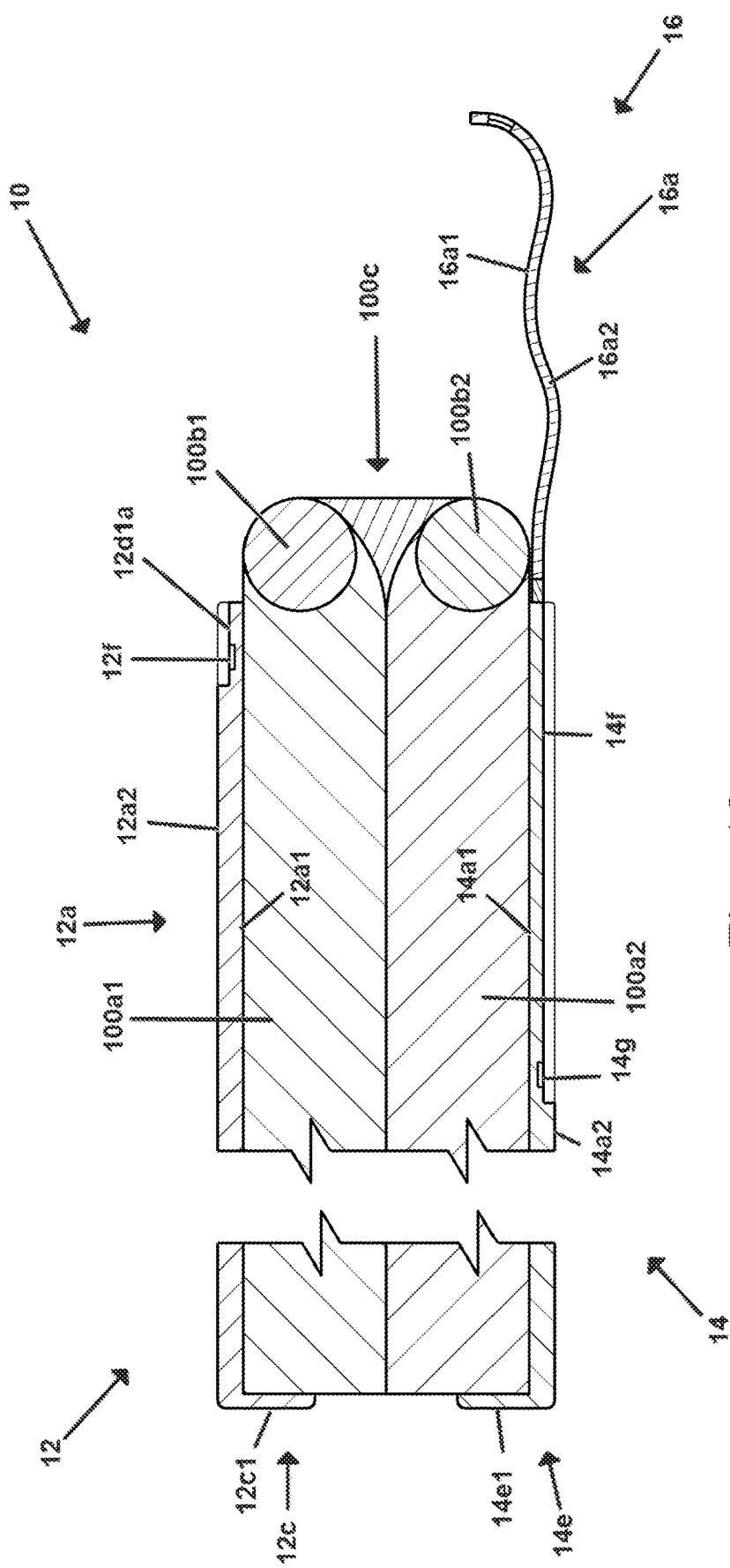
FIG. 18 is a modification of FIG. 12 showing sheet member further uncoupled from first case section.

Turning to FIG. 18, depicted therein is a modification of FIG. 12 showing sheet member further uncoupled from first case section.

Figure 19:
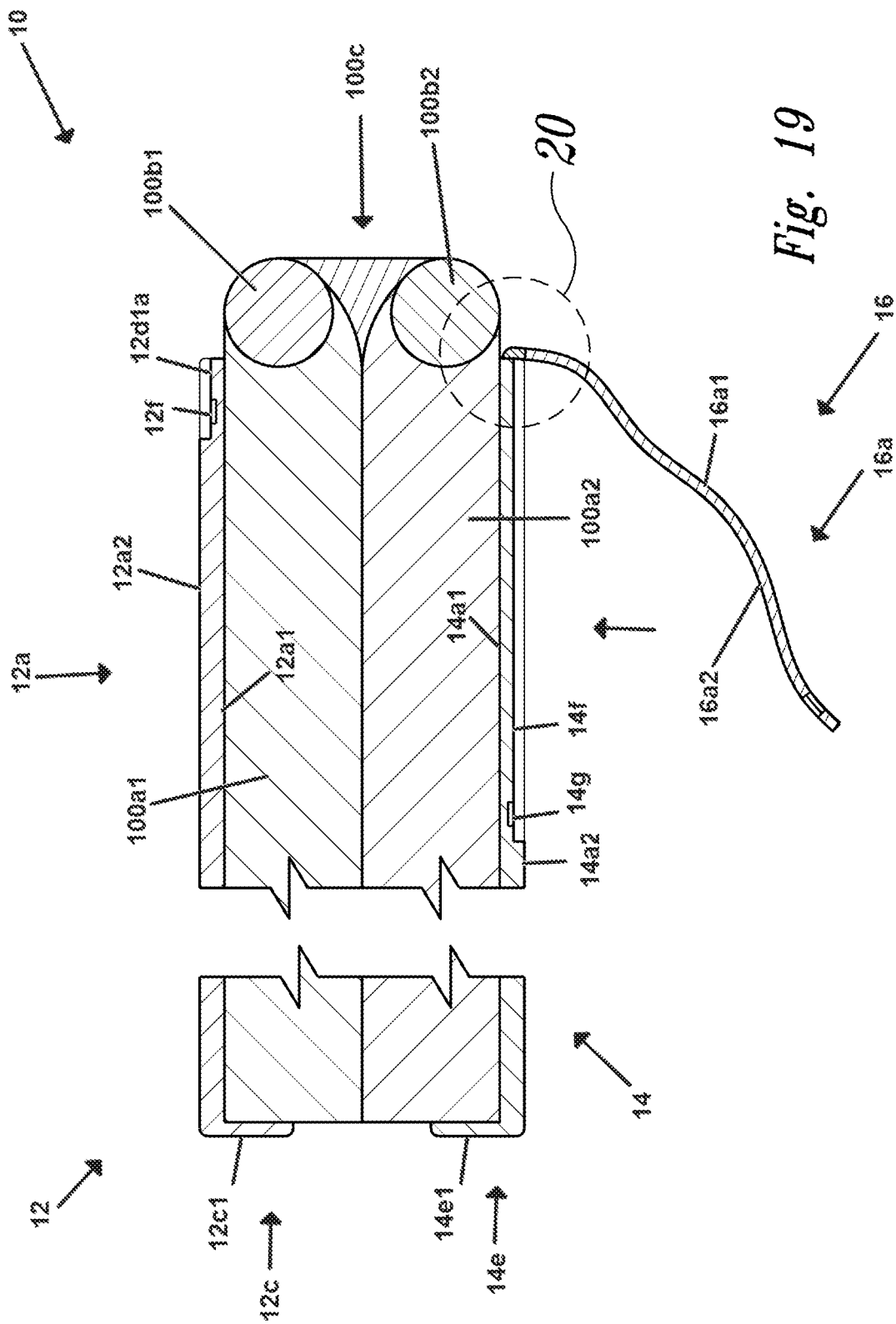
FIG. 19 is a modification of FIG. 12 showing sheet member further uncoupled from first case section and beginning to be folded back onto second case section.

Turning to FIG. 19, depicted therein is a modification of FIG. 12 showing sheet member further uncoupled from first case section and beginning to be folded back onto second case section.

Figure 20:
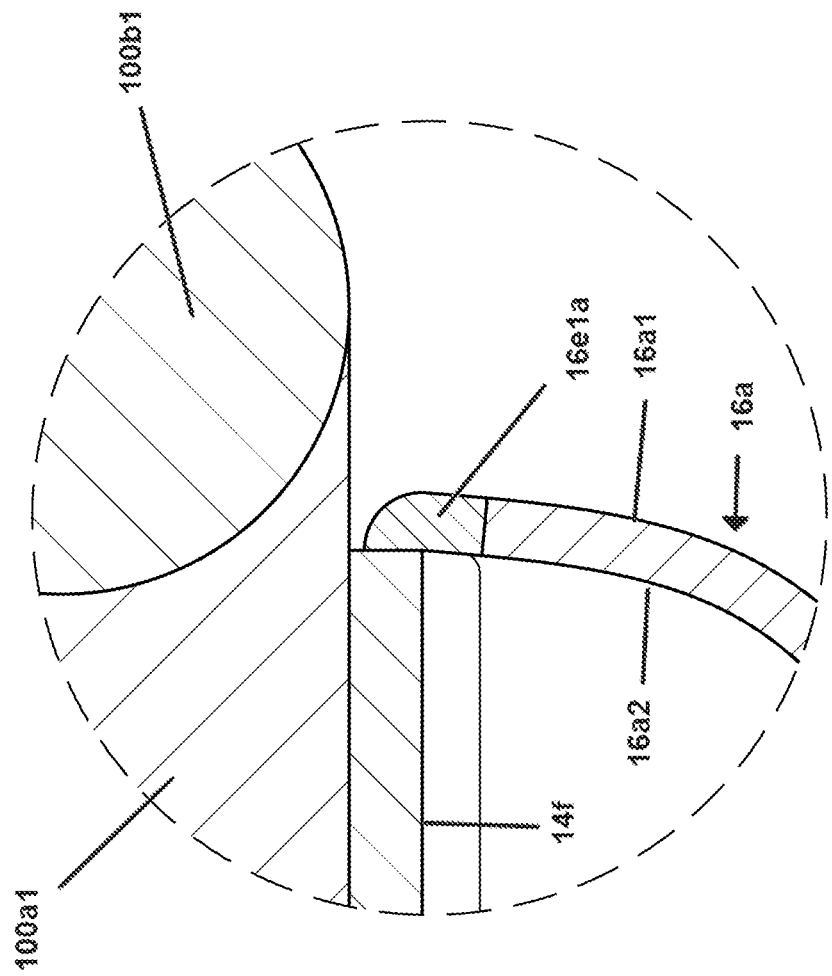
FIG. 20 is an enlarged side elevational cross-sectional view of a dashed-circle portion of the device case assembly of FIG. 19 labeled "20" shown in FIG. 19.

Turning to FIG. 20, depicted therein is an enlarged side elevational cross-sectional view of a dashed-circle portion of the device case assembly of FIG. 19 labeled "20" shown in FIG. 19.

Figure 21:
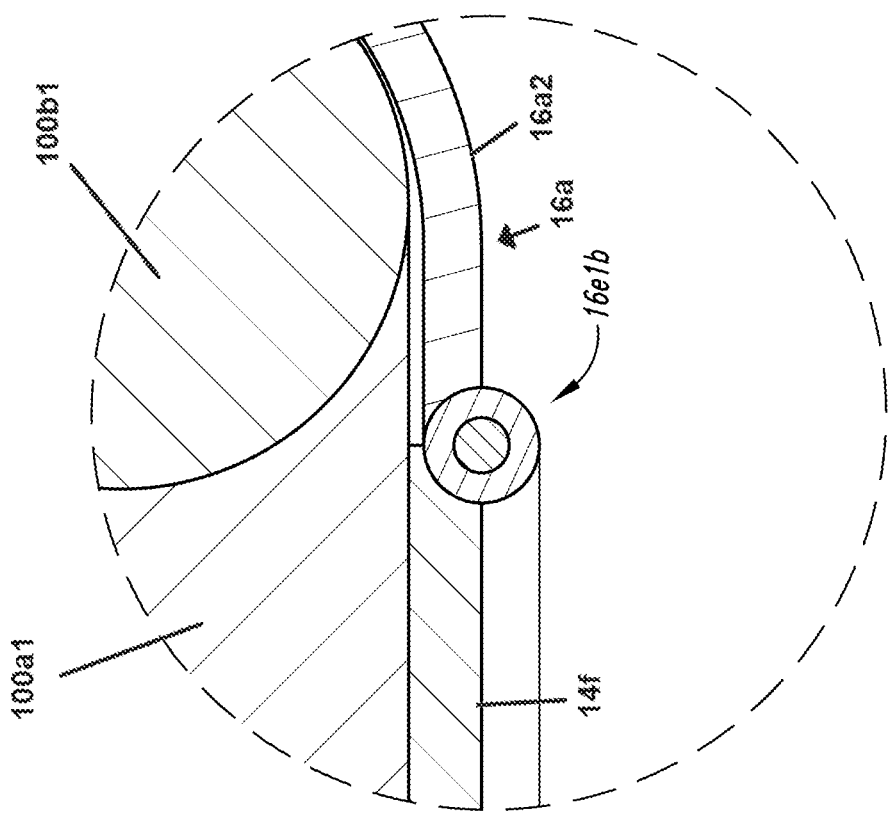
FIG. 21 is a modification of FIG. 20 showing a component alternative in a first position.

Turning to FIG. 21, depicted therein is a modification of FIG. 20 showing a component alternative in a first position. In implementations, fourth edge 16e1 is shown to include hinge 16e1b.

Figure 22:
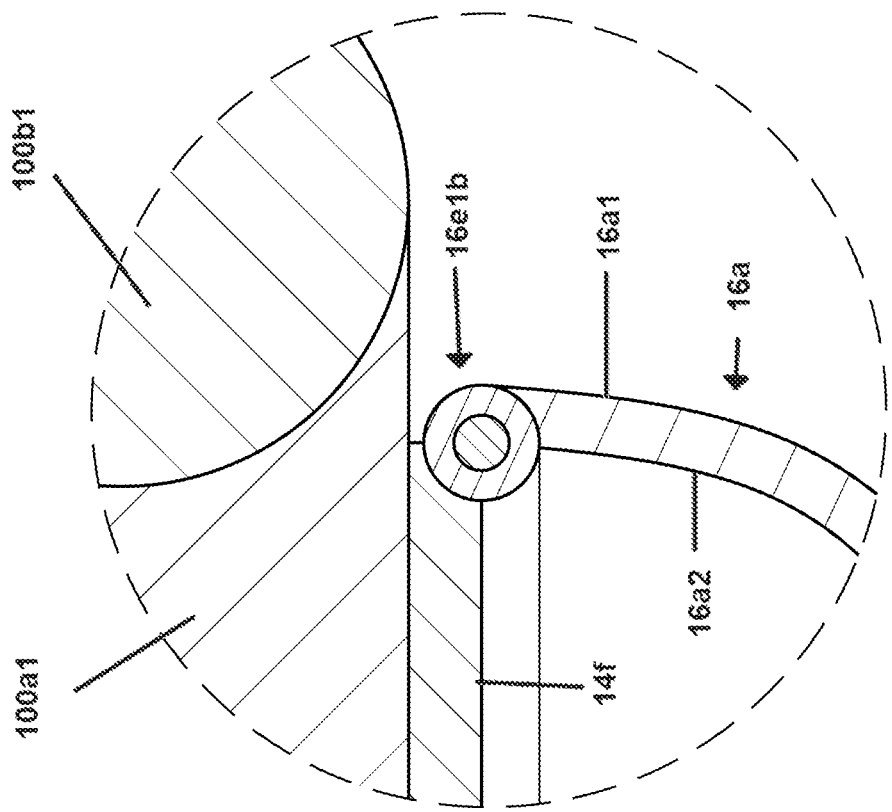
FIG. 22 is a modification of FIG. 20 showing a component alternative in a second position.

Turning to FIG. 22, depicted therein is a modification of FIG. 20 showing a component alternative in a second position.

Figure 23:
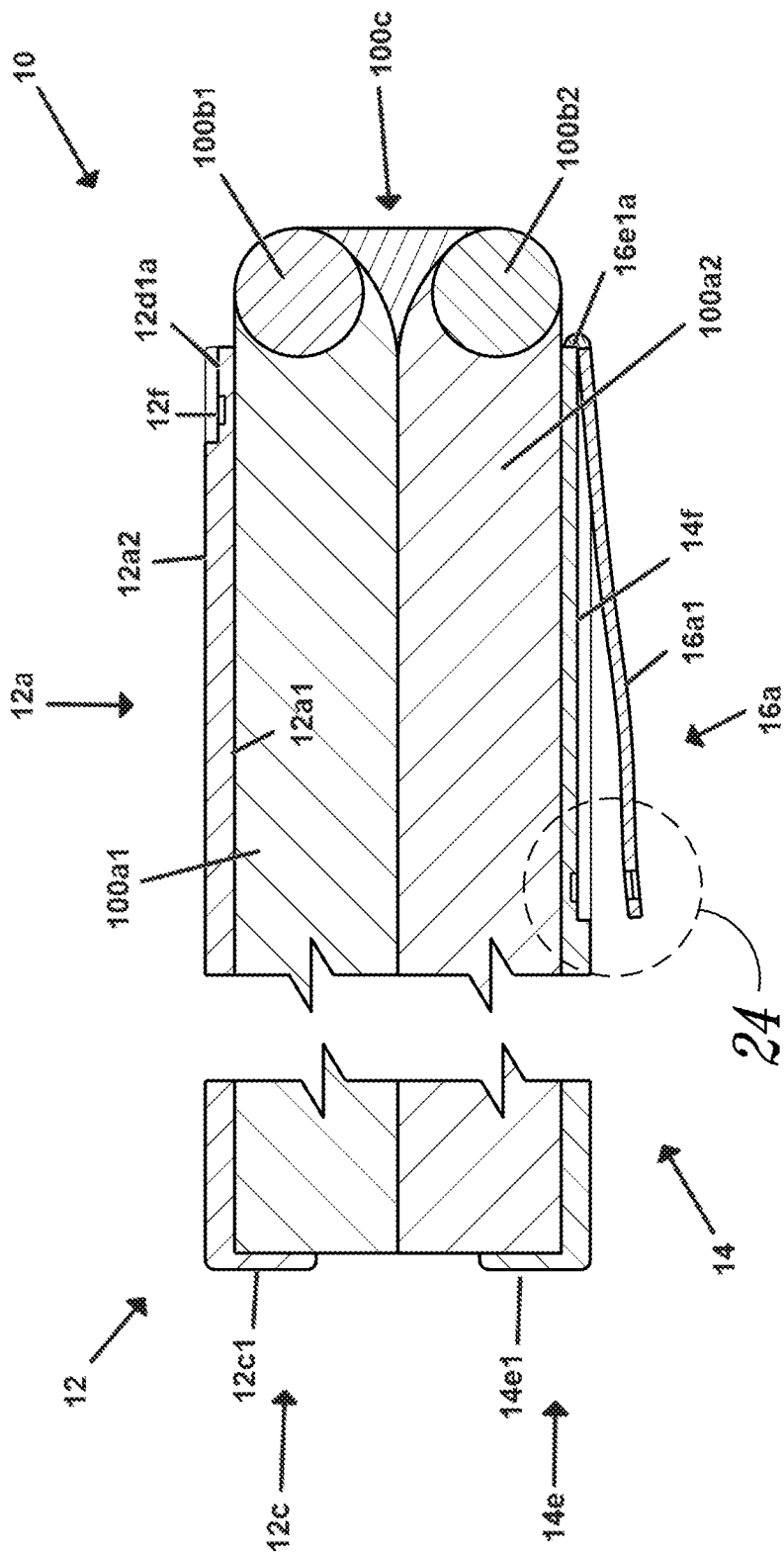
FIG. 23 is a modification of FIG. 12 showing sheet member further uncoupled from first case section and further being folded back onto second case section.

Turning to FIG. 23, depicted therein is a modification of FIG. 12 showing sheet member further uncoupled from first case section and further being folded back onto second case section.

Figure 24:
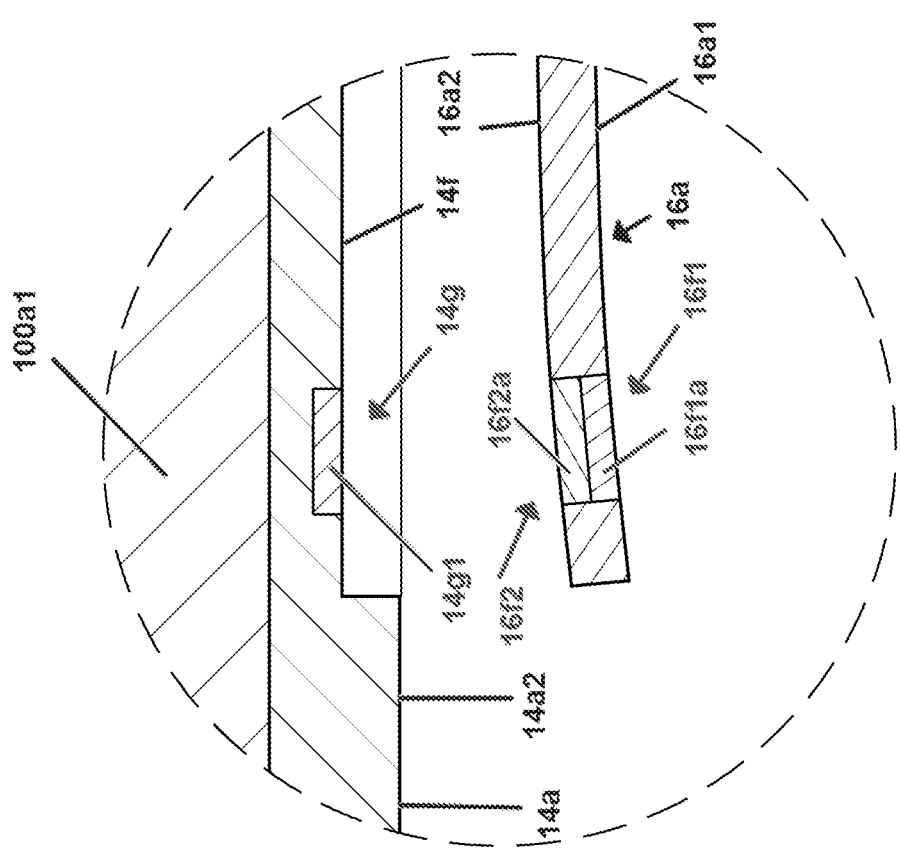
FIG. 24 is an enlarged side elevational cross-sectional view of a dashed-circle portion of the device case assembly of FIG. 23 labeled "24" shown in FIG. 23.

Turning to FIG. 24, depicted therein is an enlarged side elevational cross-sectional view of a dashed-circle portion of the device case assembly of FIG. 23 labeled "24" shown in FIG. 23. In implementations, coupler 14g is shown to include magnetic coupler 14g1.

Figure 25:
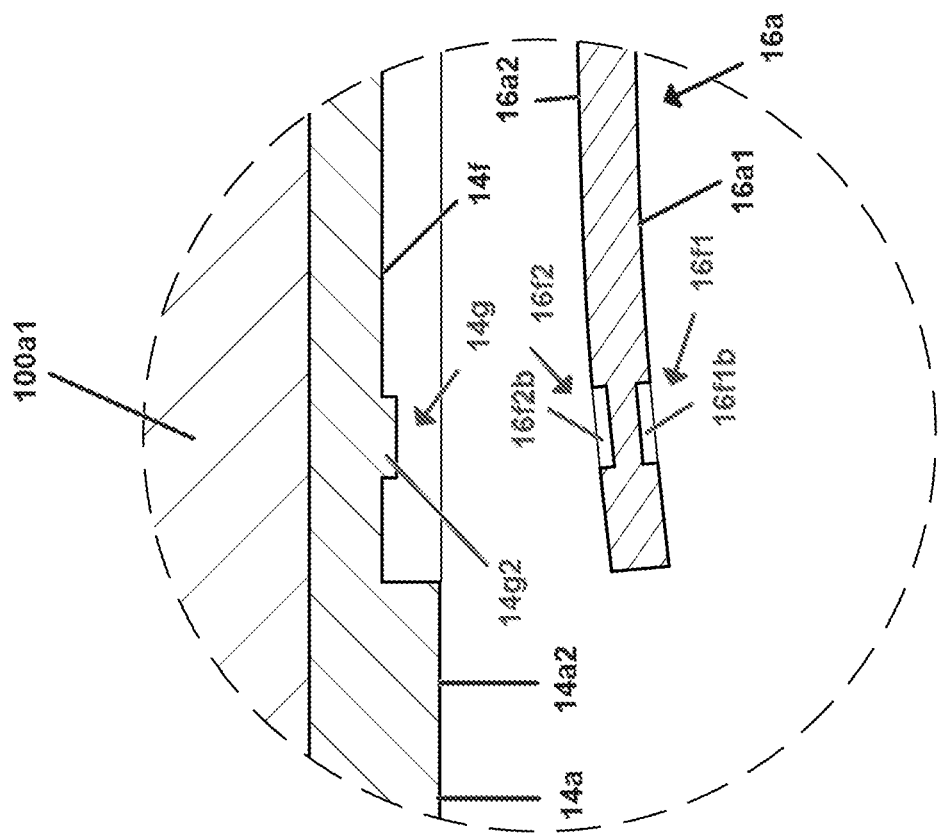
FIG. 25 is a modification of FIG. 24 showing a component alternative.

Turning to FIG. 25, depicted therein is a modification of FIG. 24 showing a component alternative. In implementations, coupler 14g is shown to include frictional coupler 14g2.

Turning to FIG. 26, depicted therein is a modification of FIG. 12 showing sheet member further uncoupled from first case section and being fully folded back onto second case section.

Figure 27:
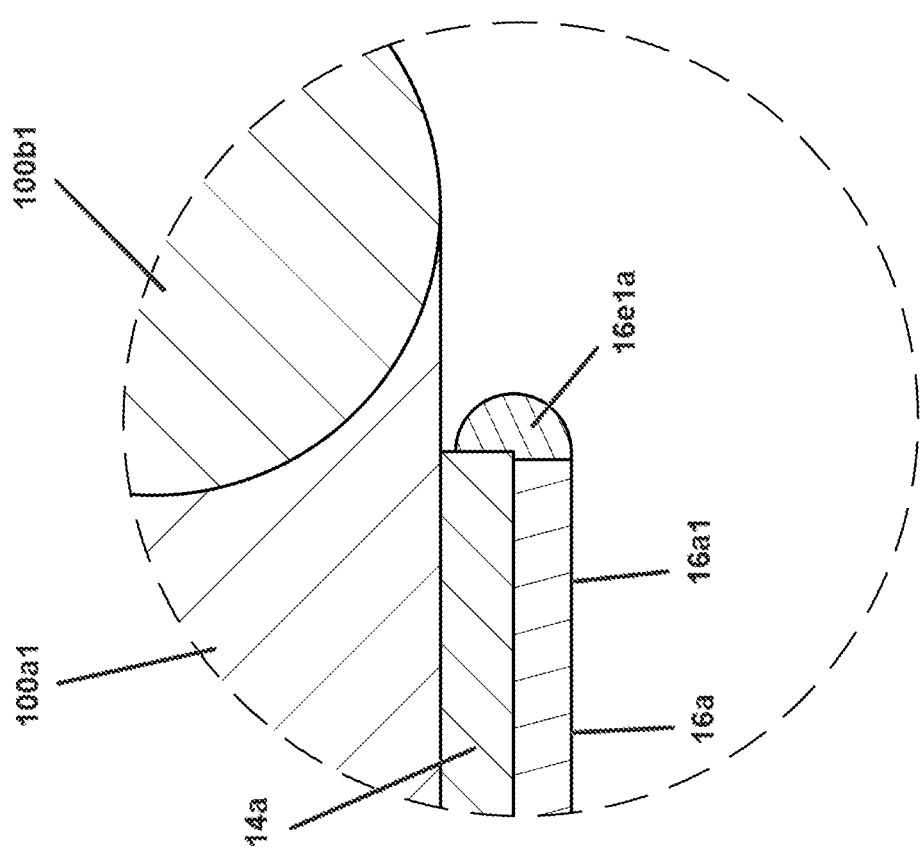
FIG. 27 is an enlarged side elevational cross-sectional view of a dashed-circle portion of the device case assembly of FIG. 26 labeled "27" shown in FIG. 26.

Turning to FIG. 27, depicted therein is an enlarged side elevational cross-sectional view of a dashed-circle portion of the device case assembly of FIG. 26 labeled "27" shown in FIG. 26.

Figure 28:
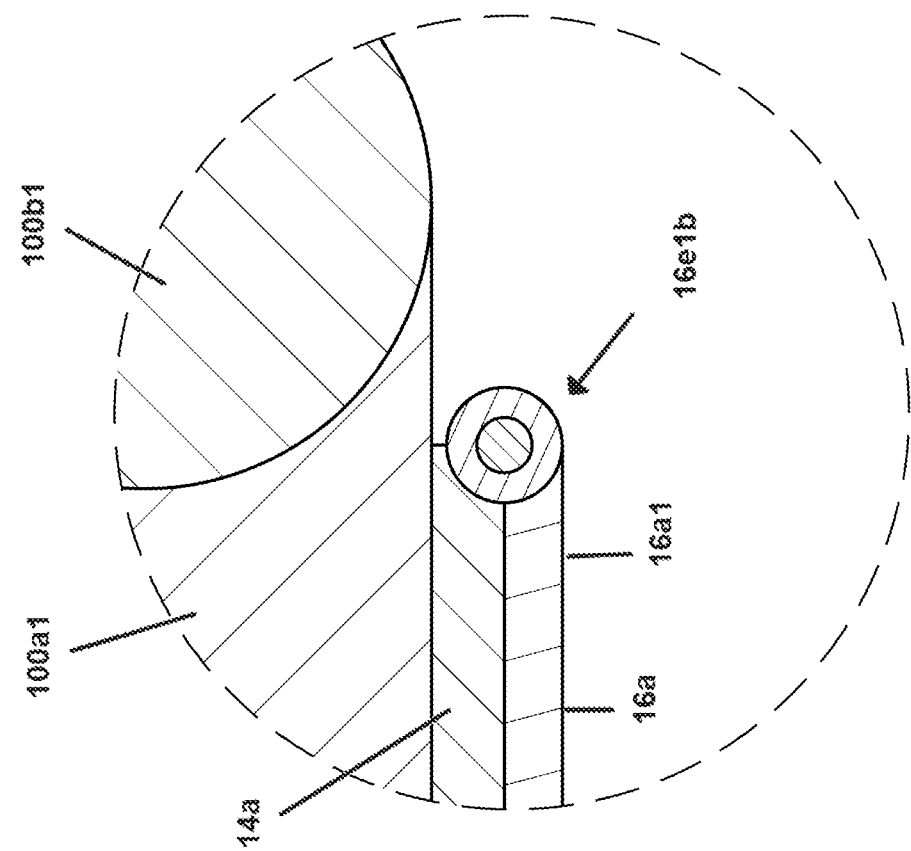
FIG. 28 is a modification of FIG. 27 showing a component alternative.

Turning to FIG. 28, depicted therein is a modification of FIG. 27 showing a component alternative.

Figure 29:
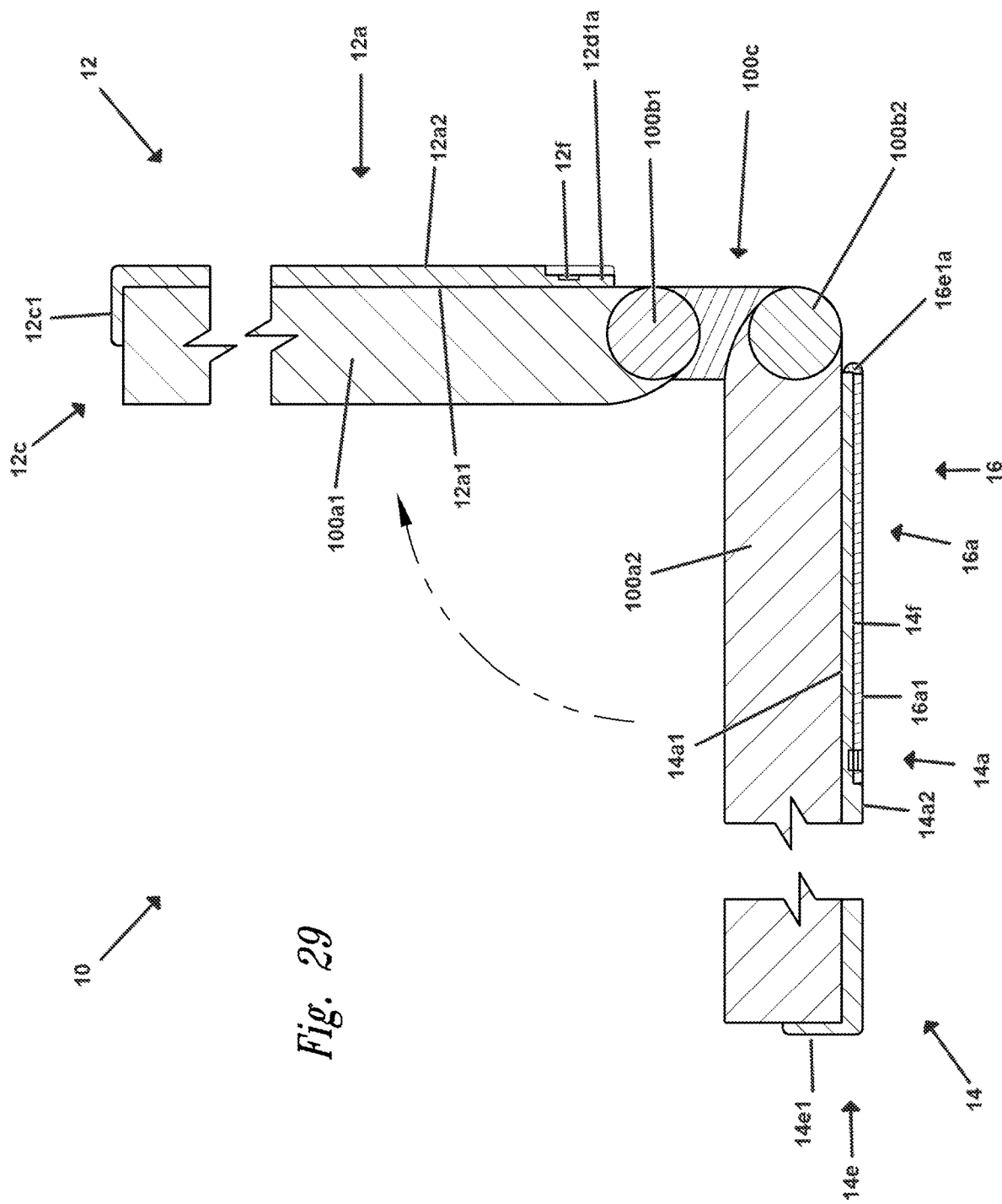
FIG. 29 is a modification of FIG. 26 showing portable electronic computing device is an alternative configuration starting to be folded back upon itself.

Turning to FIG. 29, depicted therein is a modification of FIG. 26 showing portable electronic computing device is an alternative configuration starting to be folded back upon itself.

Figure 30:
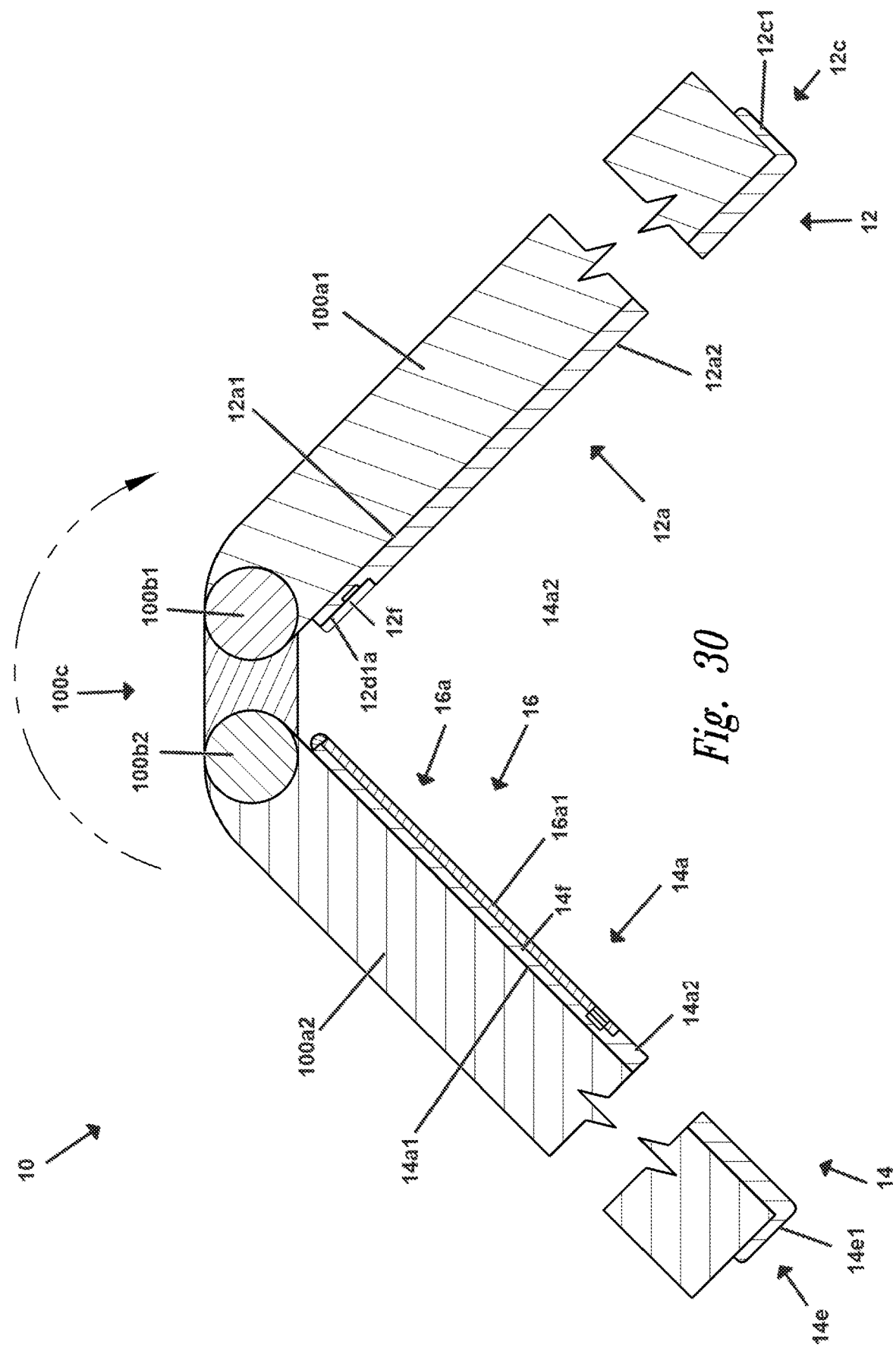
FIG. 30 is a modification of FIG. 26 showing portable electronic computing device is an alternative configuration further being folded back upon itself.

Turning to FIG. 30, depicted therein is a modification of FIG. 26 showing portable electronic computing device is an alternative configuration further being folded back upon itself.

Figure 31:
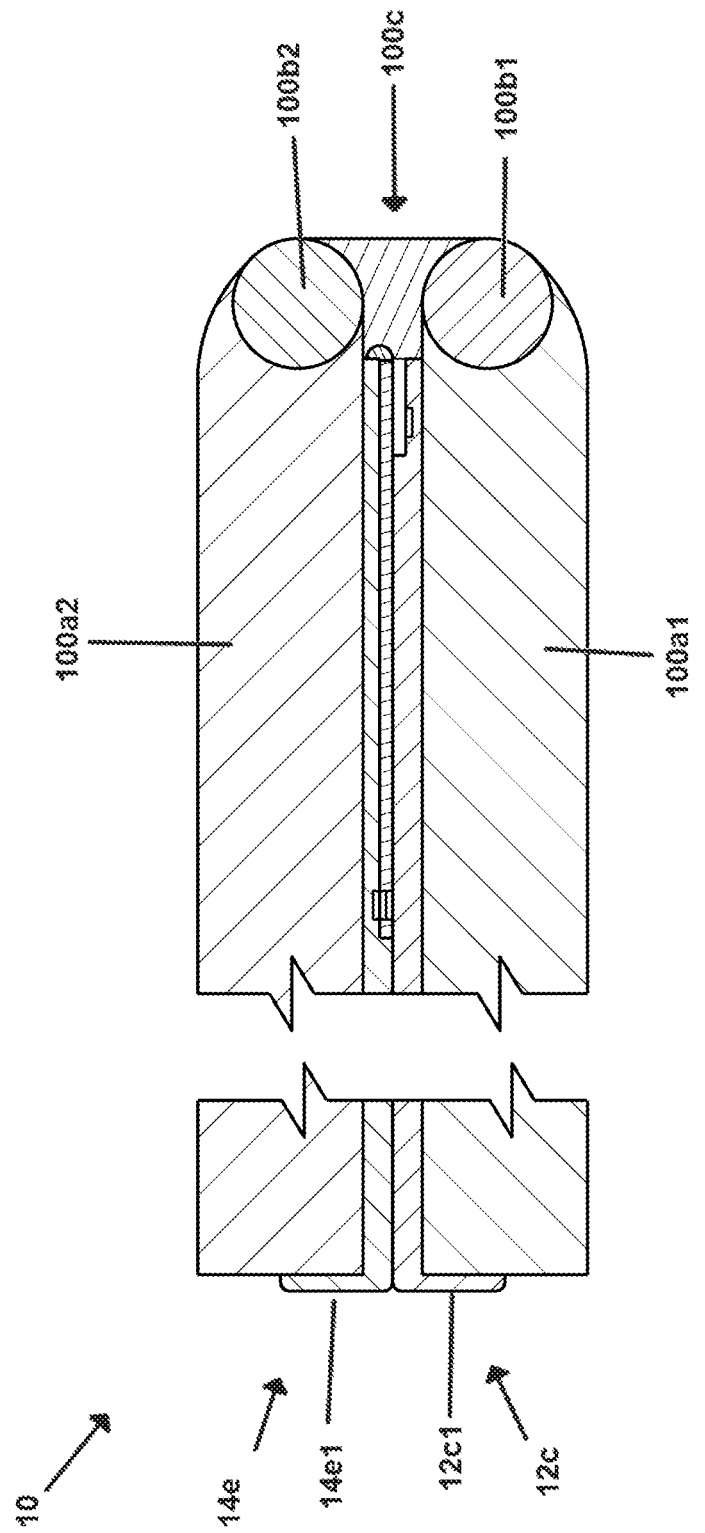
FIG. 31 is a modification of FIG. 26 showing portable electronic computing device is an alternative configuration being fully folded back upon itself.

Turning to FIG. 31, depicted therein is a modification of FIG. 26 showing portable electronic computing device is an alternative configuration being fully folded back upon itself.

As shown by one or more of FIGS. 1-31, implementations can include a system for a portable electronic computing device 100 including a first device portion 100a1 (e.g. display portion or keyboard portion), a second device portion 100a2 (e.g. keyboard portion or display portion), and a hinge portion 100c, the first device portion 100a1 (e.g. display portion or keyboard portion) hingedly coupled with the second device portion 100a2 (e.g. keyboard portion or display portion) via the hinge portion 100c, the system including (I) a first case section 12 including (A) a base 12a including an interior surface 12a1, (B) a first side 12b including a first wall 12b1 with the first wall 12b1 extending perpendicularly to the interior surface 12a1, (C) a second side 12c including a second wall 12c1 with the second wall 12c1 extending perpendicularly to the interior surface 12a1, and (D) a third side 12d including a third wall 12d1 with the third wall 12d1 extending perpendicularly to the interior surface 12a1, wherein the first wall 12b1 extends perpendicularly to the second wall 12c1, and wherein the first wall 12b1 extends parallel with the third wall 12d1 such that the first case section 12 being configured to receive the first device portion 100a1 (e.g. display portion or keyboard portion) of the portable electronic computing device 100; (II) a second case section 14 including (A) a base 14a including an interior surface 14a1, (B) a first side 14b including a first wall 14b1 with the first wall 14b1 extending perpendicularly to the interior surface 14a1, (C) a second side 14d including a second wall 14d1 with the second wall 14d1 extending perpendicularly to the interior surface 14a1, and (D) a fourth side 14e including a third wall 14e1 with the third wall 14e1 extending perpendicularly to the interior surface 14a1, wherein the first wall 14b1 extends perpendicularly to the third wall 14e1, and wherein the first wall 14b1 extends parallel with the second wall 14d1 such that the second case section 14 being configured to receive the second device portion 100a2 (e.g. keyboard portion or display portion) of the portable electronic computing device 100; and (III) a sheet member 16 including (A) a base 16a removably couplable to at least one of the following: the first case section 12 and the second case section 14, (B) the sheet member 16 including at least one portion of the base 16a being able to flexibly change between at least one first position and at least one second position when the base 16a is one of the following: removably coupled to the second case section 14 and fixedly coupled to the second case section 14, (C) the base 16a being in at least one first spatial contour and being coupled to the first case section 12 when the base 16a is in the at least one first position, and (D) the base 16a being in at least one second spatial contour and being uncoupled from the first case section 12 when the base 16a is in the at least one second position.

Implementations can include wherein when the system is receiving the portable electronic computing device 100, (A) at least one portion of the base 16a being adjacent to the hinge portion 100c of the portable electronic computing device 100 when the base 16a is in the at least one first position, and (B) at least one portion of the base 16a being nonadjacent to the hinge portion 100c of the portable electronic computing device 100 when the base 16a is in the at least one second position.

Implementations can include wherein the base 16a of the sheet member 16 is fixedly coupled to one of the following: the first case section 12 and the second case section 14

Implementations can include a hinge 16e1b wherein the base 16a of the sheet member 16 is fixedly coupled via the hinge 16e1b to one of the following: the first case section 12 and the second case section 14.

Implementations can include a reinforcement 16e1a wherein the base 16a of the sheet member 16 is fixedly coupled via the reinforcement 16e1a to one of the following: the first case section 12 and the second case section 14.

Implementations can include wherein the base 16a of the sheet member 16 includes an interior surface 16a1 and a second edge 16c1, (A) in one position of the base 16a, the interior surface 16a1 being spaced from the second case section 14 across other portions of the base 16a, and (B) in another position of the base 16a, the interior surface 16a1 being adjacent the second case section 14.

Implementations can include wherein the base 16a of the sheet member 16 being removably couplable via magnetic coupling to at least one of the following: the first case section 12 and the second case section 14.

Implementations can include wherein the base 16a of the sheet member 16 being removably couplable via frictional coupling to at least one of the following: the first case section 12 and the second case section 14.

Implementations can include wherein the base 16a of the sheet member 16 being removably couplable to the first case section 12 and being removably couplable to the second case section 14.

Implementations can include wherein the base 16a of the sheet member 16 being fixedly coupled to the second case section 14.

Implementations can include wherein the base 16a of the sheet member 16 being removably coupled to the second case section 14, the base 16a of the sheet member 16 covering the hinge portion 100c of the portable electronic computing device 100 when the first device portion 100a1 (e.g. display portion or keyboard portion) and the second device portion 100a2 (e.g. keyboard portion or display portion) are being contained by the first case section 12 and the second case section 14, respectively.

Implementations can include (A) wherein the base 14a of the second case section 14 further includes a second side 14c with an edge 14c1, (B) wherein the base 16a of the sheet member 16 further includes a fourth side 16e with a fourth edge 16e1, (C) wherein the fourth edge 16e1 of the sheet member 16 being fixedly coupled to the edge 14c1 of the second case section 14, (D) wherein the base 16a of the sheet member 16 further includes a second side 16c with a second edge 16c1, (E) wherein the second edge 16c1 of the sheet member 16 being removably coupled to the second case section 14, and (F) wherein at least a portion of the base 16a of the sheet member 16 covers a portion of the second case section 14.

Implementations can include wherein the at least a portion of the base 16a of the sheet member 16 that covers the portion of the second case section 14 includes covering a recess 14f.

Implementations can include wherein the base 14a further includes an exterior surface 14a2 being opposite a first portion of the interior surface 14a1 of the base 14a, and the recess 14f being opposite a second portion of the interior surface 14a1 of the base 14a.

Implementations can include wherein at least one of more portions of the base 16a of the sheet member 16 is made of a fabric material.

Implementations can include wherein at least one portion of the base 16a of the sheet member 16 is made of a flexible synthetic material selected from a list including but not limited to metalized material, acrylonitrile material (ABS), low density polyethylene (LDPE) material, flexible plastic material, polyvinyl chloride material, thermoplastic polyurethane material, and silicone material.

Implementations can include wherein at least one portion of the first case section 12 and at least one portion of the second case section 14 are made of a hard material selected from a list including but not limited to high-density polyethylene (HDPE) plastic.

As shown by one or more of FIGS. 1-31, implementations can include a system for a portable electronic computing device 100 including a first device portion 100a1 (e.g. display portion or keyboard portion), a second device portion 100a2 (e.g. keyboard portion or display portion), and a hinge portion 100c, the first device portion 100a1 (e.g. display portion or keyboard portion) hingedly coupled with the second device portion 100a2 (e.g. keyboard portion or display portion) via the hinge portion 100c, the system including (I) a first case section 12 including (A) a base 12a including an interior surface 12a1 such that the first case section 12 being configured to receive the first device portion 100a1 (e.g. display portion or keyboard portion) of the portable electronic computing device 100; (II) a second case section 14 including (A) a base 14a including an interior surface 14a1 such that the second case section 14 being configured to receive the second device portion 100a2 (e.g. keyboard portion or display portion) of the portable electronic computing device 100; and (III) a sheet member 16 including a base 16a coupled with an extending from the base 14a of the second case section 14, the sheet member 16 including at least one portion of the base 16a being able to flexibly change between at least one first position and at least one second position.

As shown by one or more of FIGS. 1-31, implementations can include a system for a portable electronic computing device 100 including a first device portion 100a1 (e.g. display portion or keyboard portion), and a hinge portion 100c, the first device portion 100a1 (e.g. display portion or keyboard portion) coupled with the hinge portion 100c, the system including (I) a first case section 12 including (A) a base 12a including an interior surface 12a1 such that the first case section 12 being configured to receive the first device portion 100a1 (e.g. display portion or keyboard portion) of the portable electronic computing device 100; and (II) a sheet member 16 including a base 16a coupled with an extending from the base 12a of the first case section 12, the sheet member 16 including at least one portion of the base 16a that is flexible.

Implementations can include (A) wherein at least one portion of the base 16a of the sheet member 16 is made of a flexible synthetic material selected from a list including but not limited to metalized material, acrylonitrile material (ABS), low density polyethylene (LDPE) material, flexible plastic material, polyvinyl chloride material, thermoplastic polyurethane material, and silicone material, and (B) wherein at least one portion of the first case section 12 is made of a hard material selected from a list including but not limited to high-density polyethylene (HDPE) plastic.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic computing device including a first device portion, a second device portion, and a hinge portion, the first device portion hingedly coupled with the second device portion via the hinge portion, the system comprising:

(I) a first case section including
  (A) a base including an interior surface,
  (B) a first side including a first wall with the first wall extending perpendicularly to the interior surface,
  (C) a second side including a second wall with the second wall extending perpendicularly to the interior surface, and
  (D) a third side including a third wall with the third wall extending perpendicularly to the interior surface,
  wherein the first wall extends perpendicularly to the second wall, and
  wherein the first wall extends parallel with the third wall such that
  the first case section being configured to receive the first device portion of the portable electronic computing device;

(II) a second case section including
  (A) a base including an interior surface,
  (B) a first side including a first wall with the first wall extending perpendicularly to the interior surface,
  (C) a second side including a second wall with the second wall extending perpendicularly to the interior surface, and
  (D) a fourth side including a third wall with the third wall extending perpendicularly to the interior surface,
  wherein the first wall extends perpendicularly to the third wall, and
  wherein the first wall extends parallel with the second wall such that
  the second case section being configured to receive the second device portion of the portable electronic computing device; and (III) a sheet member including
  (A) a base including
    (1) a second side, and
    (2) a fourth side,
    wherein
      (a) the second side being removably couplable to the first case section,
      (b) the second side being removably couplable to the second case section,
      (c) the fourth side being coupled to the second case section,
  (B) the sheet member including at least one first portion of the base being able to flexibly change between at least one first position and at least one second position when
    (1) the first case section receiving the first device portion of the portable electronic computing device, and
    (2) the second case section receiving the second device portion of the portable electronic computing device,
  (C) when the at least one first portion of the base of the sheet member being in the at least one first position
    (1) the base of the sheet member being in at least one first spatial contour,
    (2) the second side of the base of the sheet member being coupled to the first case section
    (3) the second side of the base of the sheet member being uncoupled from the second case section, and
  (D) when the at least one first portion of the base of the sheet member being in the at least one second position
    (1) the base being in at least one second spatial contour,
    (2) the second side of the base of the sheet member being uncoupled from the first case section, and
    (3) the second side of the base of the sheet member being coupled to the second case section.

2. The system of claim 1 wherein when the system is receiving the portable electronic computing device,
  (A) at least one second portion of the base of the sheet member being adjacent to the hinge portion of the portable electronic computing device when the at least one first portion of the base of the sheet member is in the at least one first position, and
  (B) the at least one second portion of the base of the sheet member being adjacent to the second case section when the at least one first portion of the base of the sheet member is in the at least one second position.

3. The system of claim 1 wherein the fourth side of the base of the sheet member is fixedly coupled to the second case section.

4. The system of claim 2 further comprising a hinge wherein the base of the sheet member is fixedly coupled via the hinge to the second case section.

5. The system of claim 2 further comprising a reinforcement wherein the base of the sheet member is fixedly coupled via the reinforcement to the second case section.

6. The system of claim 1 wherein when the system is receiving the portable electronic computing device,
  (A) the base of the sheet member includes oppositely facing at least one interior surface portion and at least one exterior surface,
  (B) when the at least one first portion of the base of the sheet member being the at least one first position, the at least one interior surface portion of the base of the sheet member being in physical contact with at least one portion of the first case section, and
  (C) when the at least one first portion of the base of the sheet member being in the at least one second position, the at least one exterior surface portion of the base of the sheet member being in physical contact with the second case section.

7. The system of claim 1 wherein the base of the sheet member being removably couplable via magnetic coupling to at least the first case section.

8. The system of claim 1 wherein the base of the sheet member being removably couplable via frictional coupling to at least the first case section.

9. The system of claim 1 wherein when the system is receiving the portable electronic computing device,
  (A) the base of the sheet member includes oppositely facing at least one interior surface portion and at least one exterior surface portion, (B) when the at least one first portion of the base of the sheet member being in the at least one first position, the at least one interior surface portion of the base of the sheet member facing at least one portion of the first case section, and (C) when the at least one first portion of the base of the sheet member being in the at least one second position, the at least one exterior surface portion of the base of the sheet member facing the second case section.

10. The system of claim 1 wherein
(A) the first case section includes a first recess,
(B) the second case section includes a second recess,
(C) at least one second portion of the base of the sheet member being positioned in the first recess of the first case section when the at least one first portion of the base of the sheet member is in the at least one first position, and
(D) the at least one second portion of the base of the sheet member being positioned in the second recess of the second case section when at least one first portion of the base of the sheet member is in the at least one second position.

11. The system of claim 1 wherein when the system being receiving the portable electronic computing device in an alternative configuration being fully folded back upon itself,
(A) at least one second portion of the base of the sheet member being adjacent to the second case section when the at least one first portion of the base of the sheet member is in the at least one second position.

12. The system of claim 1 wherein when the system being receiving the portable electronic computing device in an alternative configuration being fully folded back upon itself,
(A) the base of the sheet member including oppositely facing at least one interior surface portion and at least one exterior surface portion, and
(B) when the at least one first portion of the base of the sheet member being in the at least one second position, the at least one exterior surface portion of the base of the sheet member being in physical contact with the second case section.

13. The system of claim 1 wherein when the system being receiving the portable electronic computing device in an alternative configuration being fully folded back upon itself,
(A) the base of the sheet member including oppositely facing at least one interior surface portion and at least one exterior surface portion, and
(B) when the at least one first portion of the base of the sheet member being in the at least one second position, the at least one exterior surface portion of the base of the sheet member facing the second case section.

14. The system of claim 1 wherein when the system is receiving the portable electronic computing device in an alternative configuration being fully folded back upon itself,
(A) the second case section includes a second recess, and
(B) at least one second portion of the base of the sheet member being positioned in the second recess of the second case section when at least one first portion of the base of the sheet member is in the at least one second position.

15. The system of claim 1 wherein at least one or more portions of the base of the sheet member is made of a fabric material.

16. The system of claim 1 wherein at least one portion of the base of the sheet member is made of a flexible synthetic material selected from a list including but not limited to metalized material, acrylonitrile material (ABS), low density polyethylene (LDPE) material, flexible plastic material, polyvinyl chloride material, thermoplastic polyurethane material, and silicone material.

17. The system of claim 1 wherein at least one portion of the first case section and at least one portion of the second case section are made of a hard material selected from a list including but not limited to high-density polyethylene (HDPE) plastic.

18. A system for a portable electronic computing device including a first device portion, a second device portion, and a hinge portion, the first device portion hingedly coupled with the second device portion via the hinge portion, the system comprising:
(I) a first case section including
(A) a base including oppositely facing at least one interior surface portion and at least one exterior surface portion, the at least one interior surface portion such that the first case section being configured to receive the first device portion of the portable electronic computing device;
(II) a second case section including
(A) a base including oppositely facing at least one interior surface portion and at least one exterior surface portion, the at least one interior surface portion such that the second case section being configured to receive the second device portion of the portable electronic computing device; and
(III) a sheet member including a base
(A) the base coupled with and extending from the base of the second case section, the sheet member including at least one portion of the base being able to flexibly change between at least one first position and at least one second position when
(1) the first case section receiving the second device portion of the portable electronic computing device, and
(2) the second case section receiving the second device portion of the portable electronic computing device,
(B) the base including oppositely facing at least one interior surface portion and at least one exterior surface portion, wherein
(1) when the base of the sheet member being in the at least one first position,
(a) the at least one interior surface portion of the base of the sheet member facing the at least one exterior surface portion of the base of the first case section, and
(2) when the sheet member being in the at least one second position,
(a) the at least one exterior surface portion of the base of the sheet member facing the at least one exterior surface portion of the base of the second case section.

19. A system for a portable electronic computing device including a first device portion, a second device portion, and a hinge portion, the first device portion hingedly coupled with the second device portion via the hinge portion, the system comprising:
(I) a first case section including
(A) a base including oppositely facing at least one interior surface portion and at least one exterior surface portion, the at least one interior surface portion such that the first case section being configured to receive the first device portion of the portable electronic computing device;

(II) a second case section including
  (A) a base including oppositely facing at least one interior surface portion and at least one exterior surface portion, the at least one interior surface portion such that the second case section being configured to receive the second device portion of the portable electronic computing device; and
(III) a sheet member including a base,
  (A) the base coupled with and extending from the base of the second case section, the sheet member including at least one portion of the base being flexible to change between at least one first position and at least one second position when
    (1) the first case section receiving the second device portion of the portable electronic computing device, and
    (2) the second case section receiving the second device portion of the portable electronic computing device,
  (B) the base including oppositely facing at least one interior surface portion and at least one exterior surface portion, wherein
    (1) when the base of the sheet member being in the at least one first position,
      (a) the at least one interior surface portion of the base of the sheet member being in physical contact with the at least one exterior surface portion of the base of the first case section, and
    (2) when the sheet member being in the at least one second position,
      (a) the at least one exterior surface portion of the base of the sheet member being in physical contact with the at least one exterior surface portion of the base of the second case section.

20. The system of claim 19
(A) wherein the first case section including at least one first recess portion and the second case section including at least one second recess portion,
(B) wherein when the base of the sheet member being in the at least one first position, at least one first portion of the sheet member being positioned in the at least one first recess portion of the first case section, and
(C) wherein when the base of the sheet member being in the at least one second position, at least one second portion of the sheet member being positioned in the at least one second recess portion of the second case section.

\* \* \* \* \*